US008631082B2

(12) United States Patent
Moudy et al.

(10) Patent No.: US 8,631,082 B2
(45) Date of Patent: Jan. 14, 2014

(54) PERSISTING A GROUP IN AN INSTANT MESSAGING APPLICATION

(71) Applicant: Microsoft Corporation, Redmond, WA (US)

(72) Inventors: Brian Scott Moudy, Kenmore, WA (US); Aarthi Natarajan, Kirkland, WA (US); Asta Roseway, Bellevue, WA (US); Geeven Singh, Bellevue, WA (US); George Joy, Kirkland, WA (US); Ranjib Singh Badh, Sammamish, WA (US); Richard Michael Eames, Sammamish, WA (US); Marcella C. S. Rader, Shanghai (CN); Alexandra K. Heron, Kirkland, WA (US); Vasudha Chandrasekaran, Kirkland, WA (US); Nicole Danielle Steinbok, Redmond, WA (US); Steven Abrahams, Seattle, WA (US); Troy A. Schauls, Seattle, WA (US); Amy Wai-Yee Ip, Kirkland, WA (US); Melora Zaner-Godsey, Shanghai (CN); Seshagiri Panchapagesan, Redmond, WA (US); Jeroen Van Turennout, Snohomish, WA (US); Vlad Cretu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/683,459

(22) Filed: Nov. 21, 2012

(65) Prior Publication Data

US 2013/0080558 A1    Mar. 28, 2013

Related U.S. Application Data

(63) Continuation of application No. 13/305,313, filed on Nov. 28, 2011, now Pat. No. 8,341,233, which is a continuation of application No. 12/956,595, filed on Nov. 30, 2010, now Pat. No. 8,086,686, which is a continuation of application No. 12/200,411, filed on Aug. 28, 2008, now Pat. No. 7,865,563.

(51) Int. Cl.
*G06F 15/16* (2006.01)
*G06F 17/30* (2006.01)

(52) U.S. Cl.
USPC .......... 709/206; 709/201; 709/202; 709/203; 709/204; 709/205; 715/733; 715/758; 715/759; 370/431; 370/352

(58) Field of Classification Search
USPC .................................. 709/201–207, 223–228
See application file for complete search history.

(56) References Cited

U.S. PATENT DOCUMENTS 7,865,563 B2   1/2011 Moudy et al.
8,026,918 B1 *  9/2011 Murphy ........................ 345/473

(Continued)

FOREIGN PATENT DOCUMENTS

JP     2005-277806 A    10/2005
KR   10-2008-0043585 A   5/2008

OTHER PUBLICATIONS

Notice on the Third Office Action, The State Intellectual Property Office of the People's Republic of China. Mailed Date: Dec. 12, 2012, Application No. 200980134127.X, pp. 1-6.

(Continued)

*Primary Examiner* — Jude Jean Gilles
(74) *Attorney, Agent, or Firm* — Medley, Behrens & Lewis, LLC

(57) ABSTRACT

Various technologies pertaining to instant messaging are described herein. A persistent instant messaging group is created, wherein the persistent instant messaging group comprises a plurality of members and persists over a plurality of instant messaging sessions. Instances of an instant messaging application are installed on mobile telephones, and the instant messaging application is used to transmit instant messages between members of the persistent instant messaging group. Messages directed towards offline members of the persistent instant messaging group are transmitted to such members when they come online.

20 Claims, 18 Drawing Sheets

(56) References Cited

U.S. PATENT DOCUMENTS

| | | | |
|---|---|---|---|
| 8,086,686 | B2 | 12/2011 | Moudy et al. |
| 2003/0065721 | A1 | 4/2003 | Roskind |
| 2004/0041836 | A1 | 3/2004 | Zaner et al. |
| 2004/0056893 | A1* | 3/2004 | Canfield et al. ............... 345/753 |
| 2005/0132009 | A1 | 6/2005 | Solie |
| 2006/0053208 | A1 | 3/2006 | Laurila et al. |
| 2006/0227943 | A1 | 10/2006 | Yan |
| 2006/0282538 | A1 | 12/2006 | Anglin et al. |
| 2007/0005707 | A1 | 1/2007 | Teodosiu et al. |
| 2007/0168448 | A1 | 7/2007 | Garbow et al. |
| 2007/0174408 | A1* | 7/2007 | Paul et al. ..................... 709/207 |
| 2007/0198647 | A1 | 8/2007 | Lingafelt et al. |
| 2007/0203998 | A1 | 8/2007 | Demsky et al. |
| 2007/0208809 | A1 | 9/2007 | Westman |
| 2007/0288573 | A1* | 12/2007 | Malik ........................... 709/205 |
| 2008/0104173 | A1 | 5/2008 | Wilcox et al. |
| 2009/0106376 | A1* | 4/2009 | Tom et al. ..................... 709/206 |
| 2009/0172120 | A1* | 7/2009 | Ruelas .......................... 709/206 |
| 2012/0072515 | A1 | 3/2012 | Moudy et al. |

OTHER PUBLICATIONS

"Create New Chat Group", retrieved at<<http://www.xat.com/web_gear/chat/creategroup.php>>, Jun. 20, 2008, p. 1.

"Permanent Chat Rooms", retrieved at<<http://www.ramius.net/help/Advantage/tools/chat/chat_permanent.htm>>, Jun. 20, 2008, pp. 1-7.

"Permanent Rooms and Groups without Invitation", retrieved at<<http://www.igniterealtime.org/community/thread/33281>>, Jun. 20, 2008, pp. 1-2.

"Lotus Sametime Advanced", retrieved at<<http://www-306.ibm.com/software/lotus/products/sametime/advanced/index.html>>, Jun. 20, 2008, pp. 1-2.

International Search Report and Written Opinion Received for PCT Application No. PCT/US2009/054257 mailed on Mar. 29, 2010, pp. 1-11.

Notice on the Second Office Action, The State Intellectual Property Office of the People's Republic of China. Mailed Date: Jul. 20, 2012, Application No. 200980134127.X, pp. 1-9.

Reply to Notice on the Third Office Action, Filed With the State Intellectual Property Office of the People's Republic of China, Feb. 25, 2013, Application No. 200980134127.X, pp. 1-2.

Notice on the Fourth Office Action, The State Intellectual Property Office of the People's Republic of China. Mailed Date: Jul. 3, 2013, Application No. 200980134127.X, pp. 1-8.

"Supplementary European Search Report", Application No. 09810462.3, Mailed Oct. 25, 2013, pp. 1-7.

"MindAlign 2007 Key Features", May 29, 2007, Retrieval Date: Oct. 18, 2013, pp. 1-4.

"MindAlign", Jul. 21, 2005, Retrieval Date: Oct. 18, 2013, pp. 1-2.

Halevy, "Persistent.im Beta—Free Group Chat & Cross IM Network Compatibility—Awesome Stuff!", Jul. 25, 2008, Retrieval Date: Oct. 18, 2013, pp. 1-2.

* cited by examiner

PERSISTING A GROUP IN AN INSTANT MESSAGING APPLICATION

RELATED APPLICATIONS

This application is a continuation of U.S. patent application Ser. No. 13/305,313, filed on Nov. 28, 2011, and entitled "PERSISTING A GROUP IN AN INSTANT MESSAGING APPLICATION", which is a continuation of U.S. Pat. No. 8,086,686, filed on Nov. 30, 2010, and entitled "PERSISTING A GROUP IN AN INSTANT MESSAGING APPLICATION", which is a continuation of U.S. Pat. No. 7,865,563, filed on Aug. 28, 2008, and entitled "PERSISTING A GROUP IN AN INSTANT MESSAGING APPLICATION". The entireties of these applications are incorporated herein by reference.

BACKGROUND

Instant messaging allows users that use a common instant messaging client to communicate with one another in real-time. For instance, a first user of an instant messaging application can transmit text to a second user of the instant messaging application in real-time, and the second user can respond to the first user. Thus, through use of an instant messaging application, the first and second user can hold a real-time conversation.

Technology pertaining to instant messaging applications has advanced rapidly, as communications between users is not limited solely to text. For instance, an instant messaging application may allow users to share files, including documents, video files, music files, etc. Furthermore, an instant messaging application may be configured to transmit real-time video images of participants to an instant messaging conversation. More particularly, a first user may execute an instant messaging application and may initiate a conversation with a second user. The first user may (before or after the conversation has been initiated) connect a webcam to a personal computer operated by the first user. Video images of the first user may be transferred in real-time such that the second user can view video images of the first user during an instant messaging application. Still further, some instant messaging applications can be configured to transmit voice signals between users in real-time, such that users of an instant messaging application may conduct a voice conversation therebetween. Thus, instant messaging applications can be robust communication tools that incorporate numerous communication functionalities.

Many instant messaging applications are generally downloadable by way of the Internet for installation on a client computer. A user of an instant messaging application can inform the instant messaging application of contacts that also use the instant messaging application (or a different instant messaging application that is configured to communicate with the aforementioned instant messaging application). Additionally or alternatively, the user of the instant messaging application can cause invitations to be delivered (e.g., by way of email) to contacts of the user that have not installed the instant messaging application.

The graphical user interface of the instant messaging application can present a list of contacts to a user thereof, and can further indicate which of the contacts is online and possibly display a corresponding status message that describes a current status of the contact (e.g., busy, available, away, . . . ). To initiate an instant messaging communication with a contact, the user can select the contact (e.g., double-click) which causes a conversation window to appear. The user may then initiate a communication by, for example, typing a textual message that is desired to be transmitted to the contact. Such message may be transmitted to an instant messaging server and then directed to the instant messaging client of the contact. If, for example, the contact does not have a status indicating that the contact wishes to not be disturbed, a conversation window will be presented to the contact. The contact may then reply to the communication if desired.

Some instant messaging applications also allow communications to be simultaneously transmitted among several users in real-time. More specifically, a first user of an instant messaging application may select, one at a time, a plurality of other users with whom the first user wishes to communicate, wherein the plurality of users are shown as being online. The first user can then initiate a communication to all selected users, and the selected users and the first user may then communicate with one another simultaneously and in real-time. If one of the participants in the conversation closes a conversation window corresponding to the plurality of users and the first user, such participant cannot return to the conversation without being invited by one of the remaining participants. Further, if the same individuals wish to simultaneously communicate with one another at a later point in time, one of such individuals must initiate the conversation by manually selecting all of the individuals.

SUMMARY

The following is a brief summary of subject matter that is described in greater detail herein. This summary is not intended to be limiting as to the scope of the claims.

Described herein are various technologies pertaining to instant messaging in an instant messaging application. A persistent group can be created in an instant messaging application that persists across multiple instant messaging sessions. More particularly, an individual using an instant messaging application on a client device can generate a request to create a persistent messaging group. The request can include identities of other individuals that are desirably in the persistent messaging group, wherein the identities may be instant messaging identities, email addresses, etc.

An instant messaging server can receive the request and generate invitations for entities identified in the request to create the instant messaging group. The invitations can be transmitted to instant messaging applications executing on client devices that correspond to individuals/entities identified in the request. For instance, an individual identified in the request to create the persistent messaging group can receive an email invitation and can reply to such invitation indicating acceptance of the invitation to join the persistent messaging group. Upon receipt of the acceptance, the individual can be added to the persistent messaging group. The individual can remain a member of the instant messaging group until they request removal from such group.

Messages transmitted to the persistent messaging group can be sent as both online and offline messages. Furthermore, messages transmitted to the persistent messaging group can be persisted for later viewing by members of the persistent messaging group. For instance, a first member of the persistent messaging group can transmit a message that is desired to be received by other members of the persistent messaging group. Such message can be transmitted immediately to members of the persistent messaging group who are online (e.g., logged into the instant messaging application). The message can also be persisted in a data store. When a member of the persistent messaging group who was not online at the time of initial transmittal of the message comes online, the message can be automatically provided to the member as an offline message. Furthermore, when a member of the persistent messaging group logs into the instant messaging application, the member can be provided with messages over a threshold amount of time (to review previous messages pertaining to the group).

Other aspects will be appreciated upon reading and understanding the attached figures and description.

DETAILED DESCRIPTION

Figure 1:
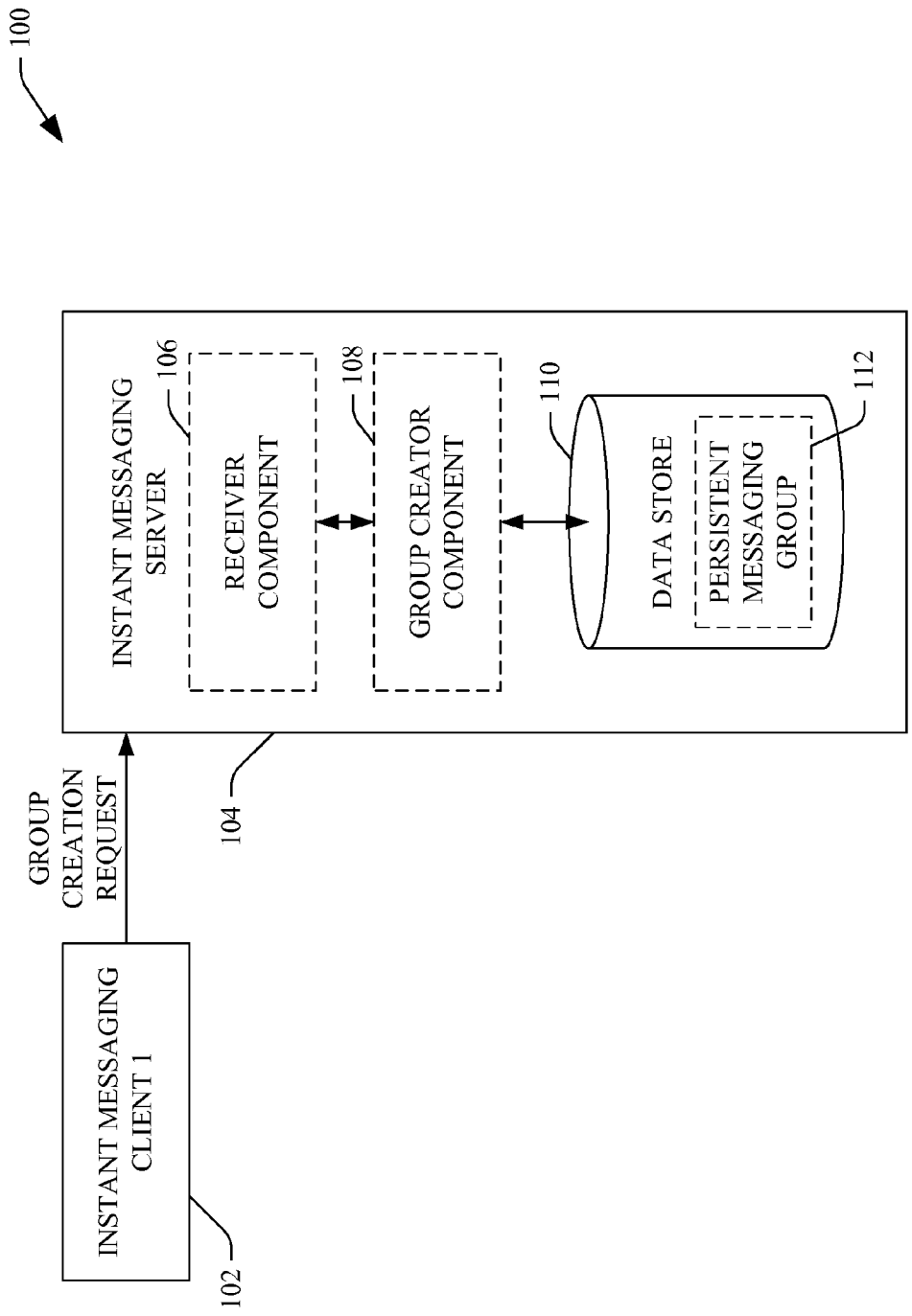
FIG. 1 is a functional block diagram of an example system that facilitates creating a persistent messaging group in an instant messaging application.

Various technologies pertaining to instant messaging in general, and persistent groups in an instant messaging application in particular, will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference now to FIG. 1, an example system 100 that facilitates creating a persistent group in an instant messaging application is illustrated. An instant messaging application can be a combination of an instant messaging client application and an instant messaging server, including communications protocols therebetween. Thus, the instant messaging application may include a dedicated client-side application that includes interfaces that facilitate communicating to individuals that also use a version of the client-side application. The instant messaging application may also include a server-side application that can route messages between individuals and/or groups, that can monitor status of contacts, amongst other activities. Furthermore, in an example, the instant messaging application can be a web-based instant messaging application, wherein the instant messaging application is built into a web browser. The system 100 includes an instant messaging client 102. The instant messaging client 102 can be instant messaging software installed on a client device and/or can be the client device together with the instant messaging software, such as a personal computer, a laptop computer, a personal digital assistant, a mobile telephone, or other suitable client device.

The instant messaging client 102 can be used by a user to initiate a group creation request. The group creation request may include an indication of one or more entities that are desirably members of a group, a name of the group, and/or permissions corresponding to the individual(s), wherein the one or more entities may be individuals or existing persistent messaging groups. For instance, the indication of the one or more entities may be email addresses corresponding to the one or more entities, messaging contact aliases of the one or more individuals, and/or the like. The permissions may include an indication of which of the one or more individuals can invite other individuals to join the group, an indication of which of the one or more individuals can post certain types of messages to the group, an indication of which of the one or more individuals can remove other individuals from the group, etc.

An instant messaging server 104 can receive the group creation request from the instant messaging client 102. For instance, the request can be received by the instant messaging server 104 by way of any suitable network, such as the Internet or an intranet. The instant messaging server 104 includes a receiver component 106 that can be configured to receive/recognize the group creation request. The instant messaging server 104 can also include a group creator component 108 that can create a persistent messaging group that is based at least in part upon the received group creation request. The instant messaging server 104 can also include a data store 110 that retains the persistent messaging group 112, wherein the persistent messaging group 112 is persisted over multiple instant messaging sessions of members of the group. While the receiver component 106, the group creator component 108, and the data store 110 are shown as residing in a single instant messaging server, it is to be understood that one or more of such entities can be located on separate devices.

As will be described in greater detail below, once the persistent messaging group 112 is created, members of the group (individuals identified in the group creation request who have accepted an invitation) can simultaneously communicate with one another through use of the instant messaging application. For example, a user of the instant messaging client 102 can initiate the instant messaging client 102 and be provided with a list of contacts that are represented by icons, wherein the created group is one of the listed contacts (and thus represented by one of the icons). By double-clicking on an icon that represents the group, the user of the instant messaging client 102 can be provided with a conversation window that can be used to transmit a message simultaneously to members of the group. In an example, the message can be transmitted only to members of the group who are currently on-line (e.g., members who are offline will not receive the message). In another example, the message can be transmitted to all members of the group regardless of whether they are online or offline. For instance, an offline user can be provided with the message upon initiating an instant messaging client (and thus go online).

A message that is transmitted to the group may include text, images, video files, music, and/or the like. For instance, a member of the group may post a video that the member wishes to share with other members of the group. In another example, the member of the group may wish to stream audio to other members of the group. Accordingly, numerous types of messages can be transmitted/received in connection with a messaging group.

As noted above, the group is persistent across multiple sessions of the instant messaging application. For example, a member of the group may receive group messages and then log off of the instant messaging application at an instant messaging client. When the user initiates the instant messaging application at the instant messaging client, the user can interact with the persistent messaging group without having to invite all members of the group. Moreover, in an example, the user may receive instant messages transmitted by other members of the group while the user was offline (e.g., not logged into the instant messaging application).

In another example, the group creation request need not include identities of other individuals. Instead, the group creation request can be tagged with an indication of interests corresponding to the group, such as "automobiles", "sports", or other topics. Moreover, such a group creation request need not originate from the instant messaging client 102, but instead can be generated at the instant messaging server 104. Thereafter, other users of the instant messaging application can join the group. For instance, such a group can be the subject of advertising, may be found via a search tool, etc.

Furthermore, the persistent messaging group 112 can be associated with various attributes like an individual instant messaging user, such as a display name, a particular display tile, a status (e.g., online, offline), a personal message (which can be set by one or more group members that have requisite permissions), and other attributes. Still further, the persistent messaging group 112 can have a corresponding email address that can be created for the persistent messaging group 112 and can be accessed by a subset of members of the persistent messaging group 112.

Figure 2:
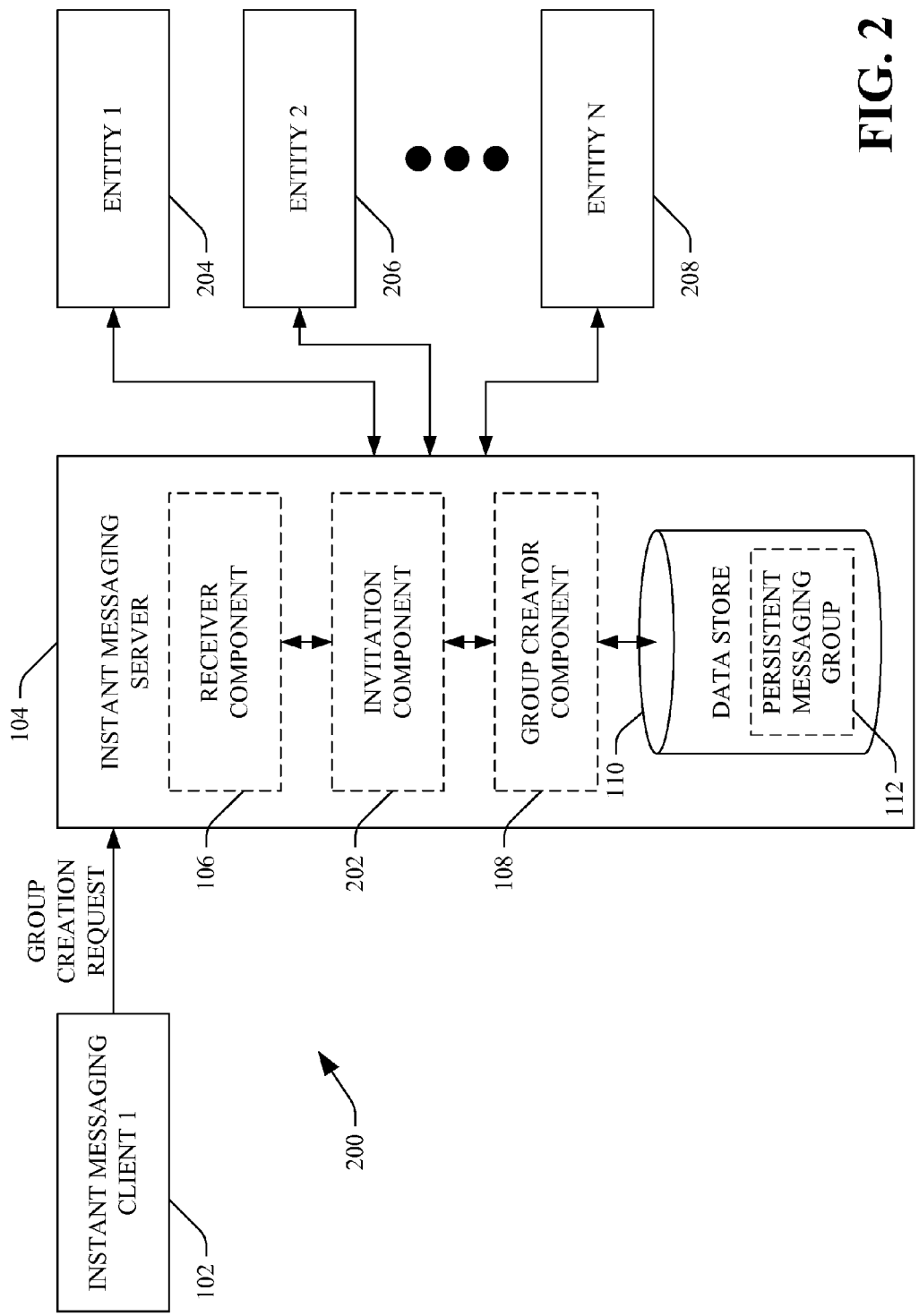
FIG. 2 is a functional block diagram of an example system that facilitates creating a persistent messaging group in an instant messaging application.

Referring now to FIG. 2, an example system 200 that facilitates creating a persistent messaging group is illustrated. The system 200 includes the instant messaging client 102 that can be configured to create and output a group creation request in response to user input. The receiver component 106 can receive and/or recognize the group creation request. The instant messaging server 104 may also include an invitation component 202 that is configured to generate and output invitations to entities included in the group creation request. In the depicted example, the invitation component 202 can output invitations to N entities 204-208 that correspond to N entities identified in the group creation request. Pursuant to an example, the invitation component 202 can deliver invitations to a subset of the N entities 204-208 by way of an instant message. For instance, the invitation component 202 can transmit an instant message to the subset of the N entities, wherein the instant message can include one or more selectable links, wherein selection of a link can cause an entity to transmit an indication of acceptance or rejection of the invitation to the instant messaging server 104.

In another example, the invitation component 202 can deliver invitations to a subset of the N entities 204-208 by way of an email message. For instance, the group creation request can include indications of email addresses of a subset of the N entities 204-208. The invitation component 202, in response to receiving the group creation request, can generate and transmit an invitation email to a subset of the N entities. The invitation email may include one or more selectable links, wherein selection of a link can cause transmission of an indication of acceptance or rejection of the invitation to the instant messaging server 104. In another example, the invitation email may include an invitation to download an instant messenger application on a client together with an invitation to join the persistent messaging group. For instance, the invitation email may include a link to a download page for an instant messenger application. In still yet another example, the invitation component 202 can deliver invitations to a subset of the N entities by way of a text message to a mobile telephone, a posting on a social network web page, or other suitable communication.

Upon receipt of the invitation to join the group from the invitation component 202, the entities 204-208 can respond to such invitation, indicating whether they wish to accept or reject the invitation to join the group. Other options for responding to the invitation can include (but are not limited to) an indication that a user wishes to respond at a later time or an indication that the user wishes to block/ignore future invitations from the group. The response can be received by the instant messaging server 104, and the group creator component 106 can update the persistent messaging group 112 in the data store 110 upon receipt of responses from entities amongst the N entities that have accepted the invitation. Accordingly, the persistent messaging group 112 does not include entities that have either a) declined the invitation, or b) failed to respond to the invitation. Thus, entities that decline the invitation or fail to respond to the invitation will not receive messages directed to the group.

Figure 3:
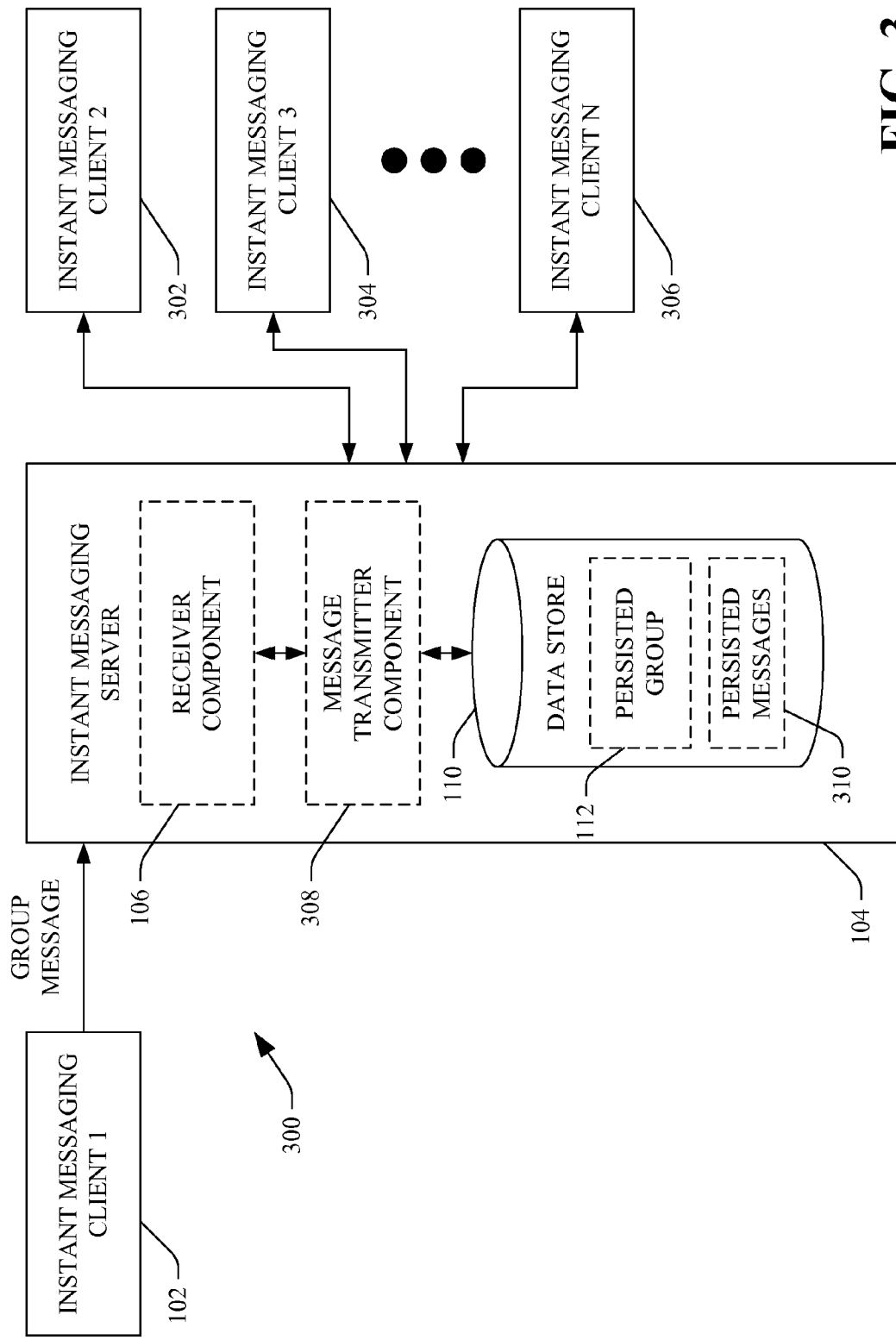
FIG. 3 is a functional block diagram of an example system that facilitates transmitting a message to a persistent messaging group in an instant messaging application.

Referring now to FIG. 3, an example system 300 that facilitates transmitting a message to a persistent messaging group is illustrated. The system 300 includes the instant messaging client 102, wherein the instant messaging client is configured to transmit a group message. In other words, the instant messaging client 102 can transmit a message to the persistent messaging group 112. The persistent messaging group 112 can include a first entity that uses the instant messaging client 102, a second entity that uses a second instant messaging client 302, a third entity that uses a third instant messaging client 304, and an Nth entity that uses an Nth instant messaging client 306. Pursuant to an example, all of the N entities may be online (e.g., currently using each one's respective instant messaging client). Each individual that uses the second instant messaging client 302, the third instant messaging client 304, and the Nth instant messaging client 306 can be shown as being online to the group as such clients 302-306 come online.

The group message output by the instant messaging client 102 can be received by the instant messaging server 104. For instance, the receiver component 106 can receive the group message and recognize that the message is desirably disseminated to all entities of the persistent messaging group 112. The instant messaging server 104 can additionally include a message transmitter component 308, which can access the data store 110 and determine which entities are members of the persistent messaging group 112. For instance, the persistent messaging group 112 in the data store 110 may indicate contact information of members of the persistent messaging group 112. The message transmitter component 308 may transmit the group message to each member of the group who is currently online (e.g., using that member's respective instant messaging client). Furthermore, the message transmitter component 308 can cause the message to be retained in the data store 110 (or other data store) as persisted messages 310. Thus, when a member of the group logs onto the instant messaging application at a client device and a conversation window pertaining to the group is open, such conversation window can present new messages as they are transmitted in real-time as well as messages previously received. Furthermore, the data store 110 can retain other group information that can be used in connection with group communications, such as a visual background pattern for the group, wherein a conversation window corresponding to the group can include the background pattern.

In another example, the instant messaging client 102 can transmit an instant message to a member of the group that is not among contacts of an individual using the instant messaging client 102. For instance, the individual (individual A) can use the instant messaging client 102 to transmit a message to another individual (individual B) by way of the persisted group 112 by selecting individual B in a listing of members of the group. A message transmitted in such a manner may have a format of "To: user B via: persisted group 112".

Figure 4:
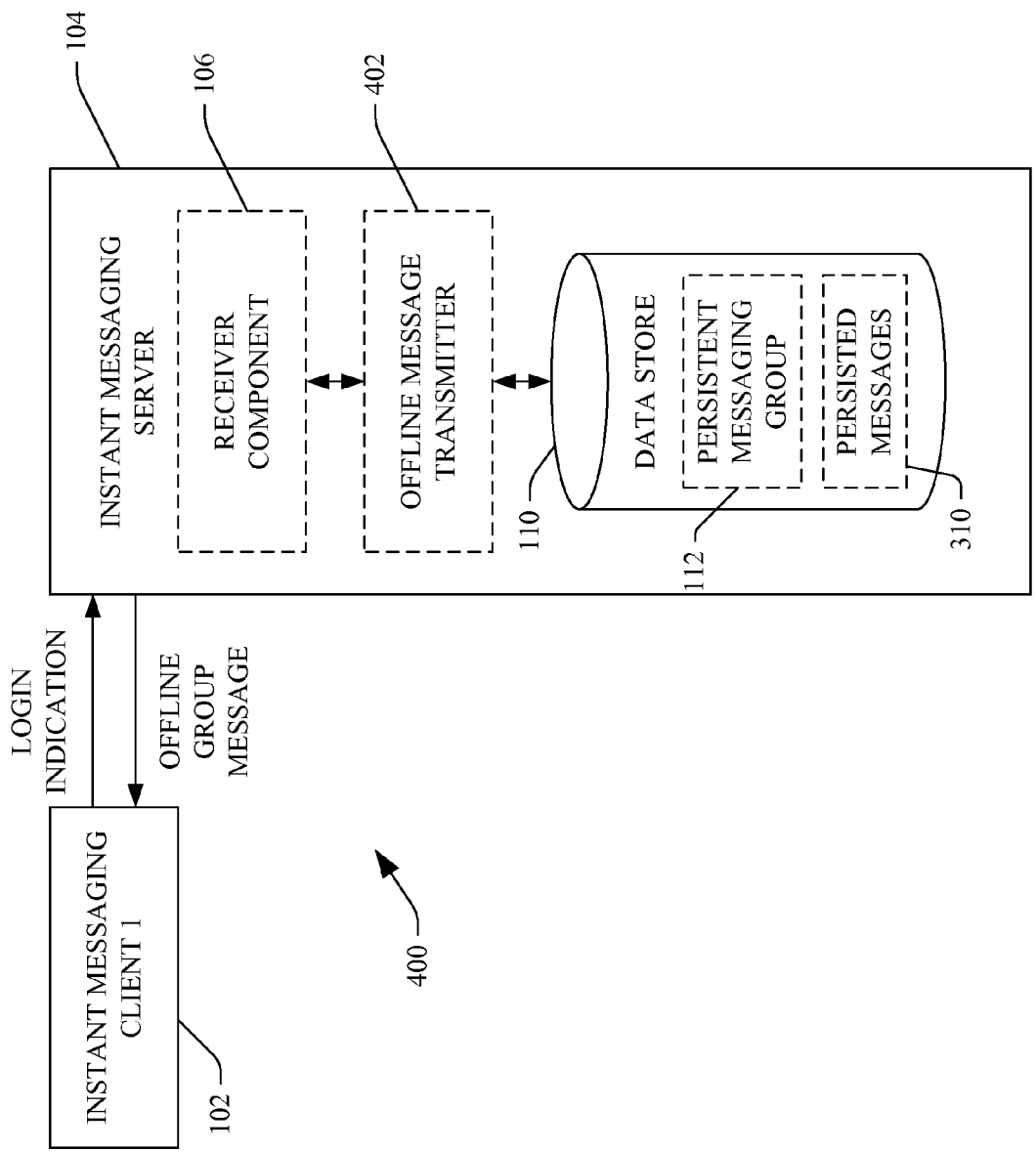
FIG. 4 is a functional block diagram of an example system that facilitates transmitting an offline message to at least one member of a persistent messaging group in an instant messaging application.

With reference now to FIG. 4, an example system 400 that facilitates transmitting a message to a group member that was originally submitted when the group member was offline (e.g., not logged into an instant messaging application at a client device) is illustrated. The system 400 includes the instant messaging client 102, wherein the instant messaging client 102 is transitioning from an offline to an online status. For instance, an individual corresponding to the instant messaging client 102 may have previously exited the instant messaging client. In an example, the individual may be a member of a persistent messaging group. During a time period when the instant messaging client was offline, a member of the persistent messaging group may have transmitted a group message (e.g., a message intended for all members of the group). As noted previously, transmitted messages directed towards the group may be retained as persisted messages 310 in the data store 110.

The instant messaging server 104 can receive an indication that the instant messaging client 102 has logged in (the instant messaging client 102 has gone online). For instance, the receiver component 106 can receive an indication that the instant messaging client 102 has gone online. An offline message transmitter 402 can receive such an indication from the receiver component 106, and can access the persisted messages 310 in the data store 110, and transmit messages to the instant messaging client 102 that were originally transmitted by a member of the group when the instant messaging client 102 was offline. For instance, the offline message transmitter 402 can transmit only messages not previously received by the instant messaging client 102. In another example, the offline message transmitter 402 can transmit messages transmitted by a group member while the instant messaging client 102 was offline as well as previously received messages (e.g., sent within a defined time window).

Figure 5:
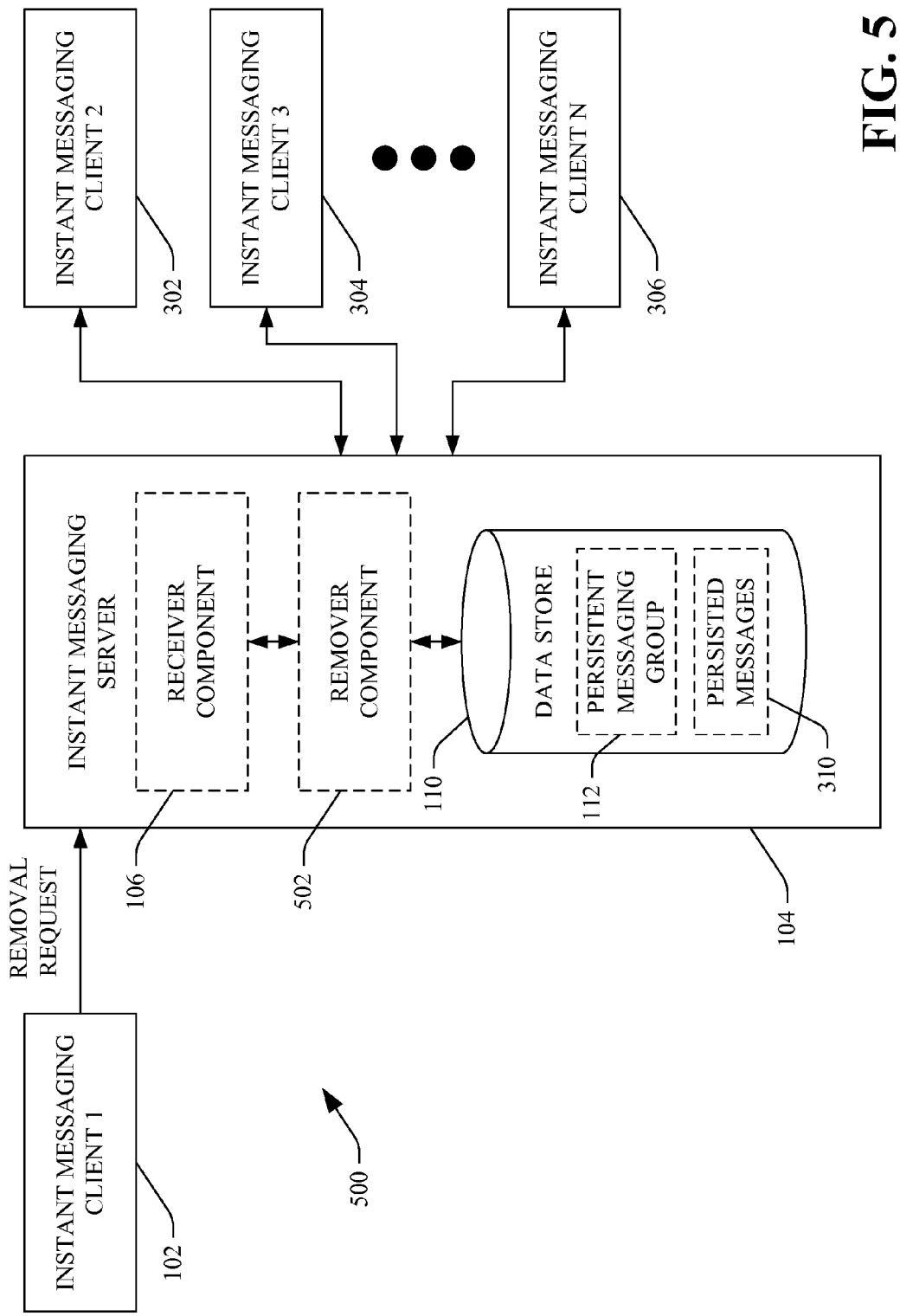
FIG. 5 is a functional block diagram of an example system that facilitates removing an entity from a persistent messaging group in an instant messaging application.

Referring now to FIG. 5, an example system 500 that facilitates removing a member of a persistent messaging group is illustrated. The system 500 includes the instant messaging client 102, wherein the instant messaging client 102 is used by an individual that is a member of the persistent messaging group 112. Such individual, however, may no longer wish to receive messages from the group (e.g., the individual may no longer wish to be a member of the persistent messaging group 112). The individual can cause the instant messaging client 102 to transmit a removal request, which indicates that the individual no longer wishes to be a member of the persistent messaging group 112. The instant messaging server 104 can receive such request.

For instance, the receiver component 106 can receive the removal request and can recognize such removal request. A remover component 502 can be in communication with the receiver component 106 and can receive the removal request. The remover component 502 can access the data store 110 and modify the persistent messaging group 112 to cause the individual corresponding to the instant messaging client 102 to be removed from the persistent messaging group 112. Upon being removed from the persisted instant messaging group 112, the individual may no longer receive messages transmitted from other instant messaging clients that are directed towards the group.

In another example, a first individual corresponding to the instant messaging client 102 may have privileges to remove a second individual from the persistent messaging group 112. For instance, the first individual may wish to remove a second individual that corresponds to the second instant messaging client 302 from the persistent messaging group 112. The first individual may cause the first instant messaging client 102 to transmit a request to remove the second individual from the persistent messaging group 112. The receiver component 106 in the instant messaging server 104 can receive and recognize the request. The remover component 502 may access the data store 110 and cause the second individual to be removed from the persistent messaging group 112 in response to receiving the removal request. The remover component 502 can also transmit a notice to the second instant messaging client 302 to inform the second individual that they have been removed from the persistent messaging group 112.

In still yet another example, the remover component 502 may remove an individual upon receiving an indication from a plurality of other members in the persistent messaging group 112 indicating that the plurality of other members wishes to remove the individual from the persistent messaging group 112. For instance, the remover component 502 can remove an individual from the persistent messaging group 112 upon receiving an indication from a majority of members of the persistent messaging group that the individual is desirably removed from the persistent messaging group 112.

Furthermore, while the above examples describe removing individuals, it can also be understood that the remover component 502 can be configured to remove a persistent messaging group from the persistent messaging group 112. For instance, as noted above, the persistent messaging group 112 can include individuals and/or other persistent messaging groups. Accordingly, an individual that has appropriate permissions can request that an entire group be removed from the persistent messaging group 112, and the remover component 502 can access the data store 112 and cause removal of the entire group.

Figure 6:
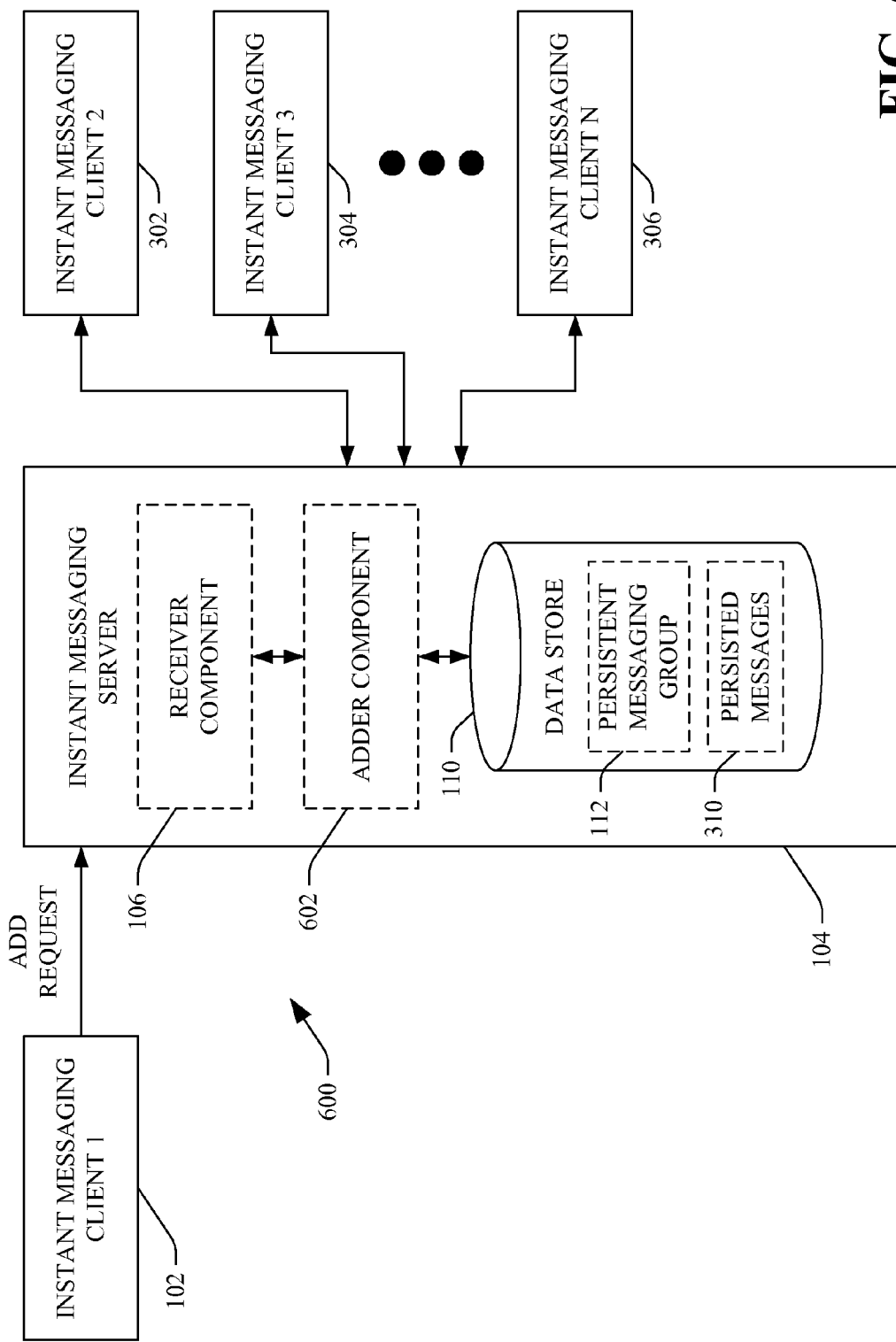
FIG. 6 is a functional block diagram of an example system that facilitates adding an entity to a persistent messaging group in an instant messaging application.

Turning to FIG. 6, an example system 600 that facilitates adding an individual to a persistent messaging group is illustrated. In an example, the first instant messaging client 102 may be used by a first individual that is member of the persistent messaging group 112, wherein the first individual can have permissions to invite other individuals and/or groups to join the existing persistent messaging group 112. The first individual can cause the first instant messaging client 102 to transmit a request to add a second individual to the persistent messaging group 112. For instance, the first individual can cause the first instant messaging client 102 to output an add request. The add request can include an identification of at least one individual or group, such as an email address or other suitable unique identification.

The receiver component 106 in the instant messaging server 104 can receive the request and recognize that the request is an add request. An adder component 602 can receive the add request and transmit an invitation to join the persistent messaging group 112 to the instant messaging client(s) that correspond to individuals and/or groups identified in the add request. In an example, the first individual corresponding to the first instant messaging client 102 can output an add request indicating that a second individual corresponding to the second instant messaging client 302 is desired to be added to the persistent messaging group 112. The adder component 602 can receive such request and output an invitation that is directed to the second individual (e.g., an email message, an instant message, a text message, . . . ). The second individual can respond to the invitation, and the response can be received by the adder component 602. If the second individual accepts the invitation, the adder component 602 can access the data store 110 and cause the second individual to be added to the persistent messaging group 112. Accordingly, the second individual can receive messages that are transmitted to the persistent messaging group 112 (e.g., at the second instant messaging client 302) and can transmit messages to the persistent messaging group 112.

In another example, the first individual corresponding to the first instant messaging client 102 may not be a member of the persistent messaging group 112, but may wish to join the group. Accordingly, the first individual can cause the first instant messaging client 102 to transmit a request to be added to the persistent instant messaging group 112 (e.g., the first individual can identify the persistent messaging group by way of a unique identifier). The receiver component 106 in the instant messaging server 104 can receive and recognize the request, and the adder component 602 can transmit a request to allow the first individual to join the persistent messaging group 112 to at least one other member of the persistent messaging group 112. For instance, the adder component 602 can transmit an instant message to the second instant messaging client 302 that indicates that the first individual desires to join the persistent messaging group 112, wherein a second individual that is a member of the persistent messaging group 112 uses the second instant messaging client.

The second instant messaging client 302 can be used to respond to the received instant message indicating whether the second individual wishes to allow the first individual to join the persistent messaging group 112. The adder component 602 can receive the response from the second instant messaging client 302 and, if the second individual wishes to allow the first individual to join the persistent messaging group 112, the adder component 602 can access the data store 110 and cause the first individual to be added to the persistent messaging group 112. In another example, the adder component 602 can transmit requests to allow members to join a group in other message formats, such as by way of email.

Figure 7:
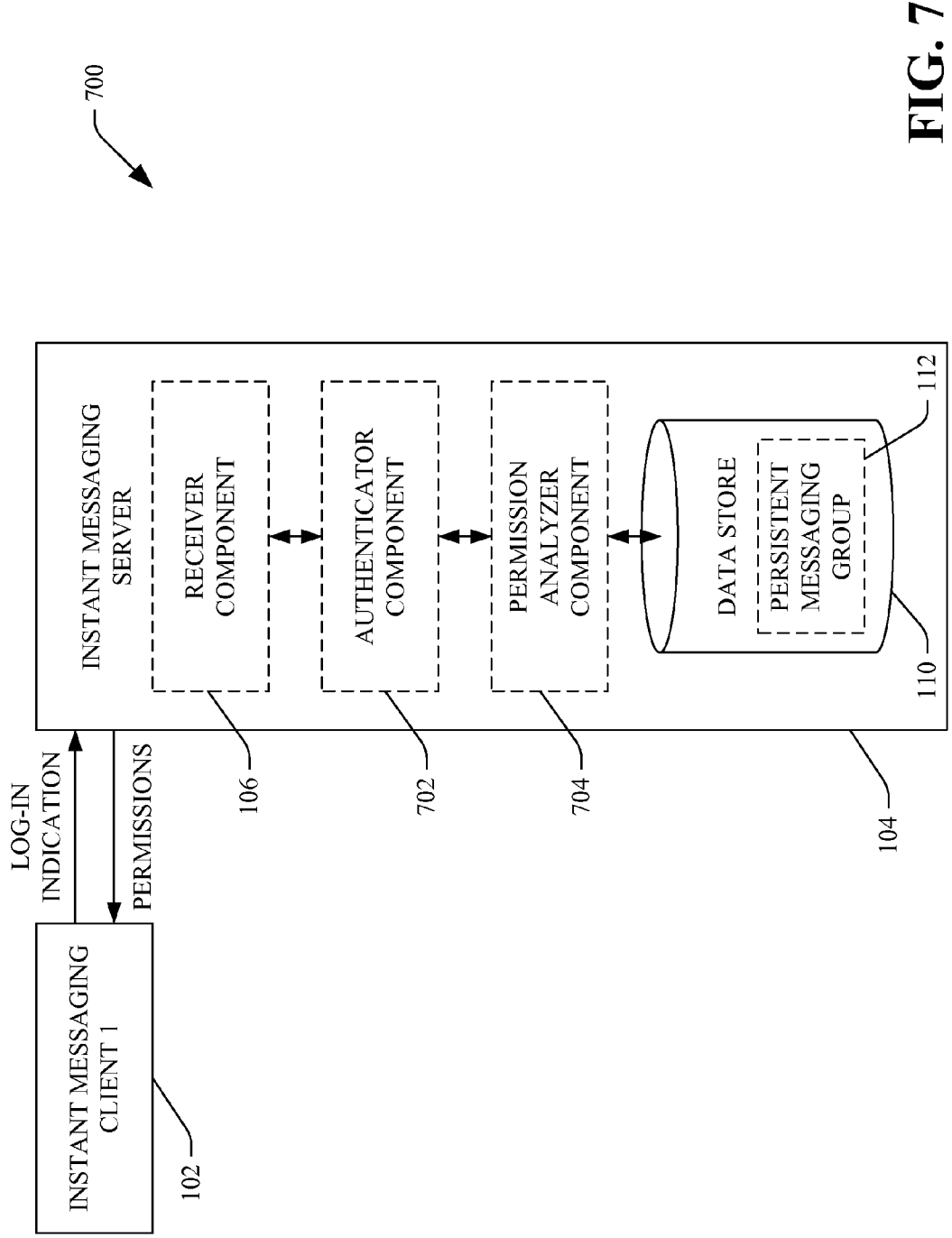
FIG. 7 is a functional block diagram of an example system that facilitates modifying message parameters in a persistent messaging group.

Turning now to FIG. 7, an example system 700 that facilitates providing permissions corresponding to group messaging to an instant messaging client is illustrated. The system 700 includes the instant messaging client 102 that is used by an individual that is a member of the persistent messaging group 112. The individual initiates the instant messaging client 102 on a client computing device, and the instant messaging client 102 outputs login information. The instant messaging server 104 receives the login information and authenticates the individual. For example, the receiver component 106 can receive the login information, and an authentication component 702 can authenticate the login information (e.g., analyze the username and password).

Upon the login information being authenticated, a permission analyzer component 704 can determine permissions of the individual with respect to the persistent messaging group 112. For instance, different members of the persistent messaging group 112 may have different permissions to perform disparate actions. In an example, the permission analyzer component 704 can determine that the individual has permission to invite others to join the persistent messaging group 112, to set a background of conversation windows pertaining to the persistent messaging group 112, and to create shared folders (e.g., folders that are accessible by members of the persistent messaging group 112). The instant messaging server 104 can direct permission information to the instant messaging client 102, and the instant messaging client 102 can be configured in accordance with the permission information. For instance, certain icons may be enabled and/or particular icons may be disabled with respect to the persistent messaging group 112 in a graphical user interface of the instant messaging client 102.

In another example, the permission analyzer component 704 can ascertain that the individual has permission to add a shared folder that is accessible to other members of the persistent messaging group 112, but does not have permission to invite others to join the persistent messaging group 112. Again, the instant messaging server 104 can transmit permission information to the instant messaging client 102, and the instant messaging client 102 can be configured based at least in part upon the permissions.

In yet another example, permission analyzer component 704 can determine that the individual does not have permission to invite another individual to join the persistent messaging group 112, does not have permission to create a new shared folder for the persistent messaging group 112, and does not have permission to set a background for conversation windows pertaining to the persistent messaging group 112. Instead, the permission analyzer component 704 can ascertain that the individual has permission to post messages (including audio and video files) and add files to pre-existing shared folders. Again, the instant messaging server 104 can transmit such permission information to the instant messaging client 102, and the instant messaging client 102 can be configured based at least in part upon the permissions. While various examples of possible permissions have been provided herein, it is to be understood that other permissions are contemplated.

Figure 8:
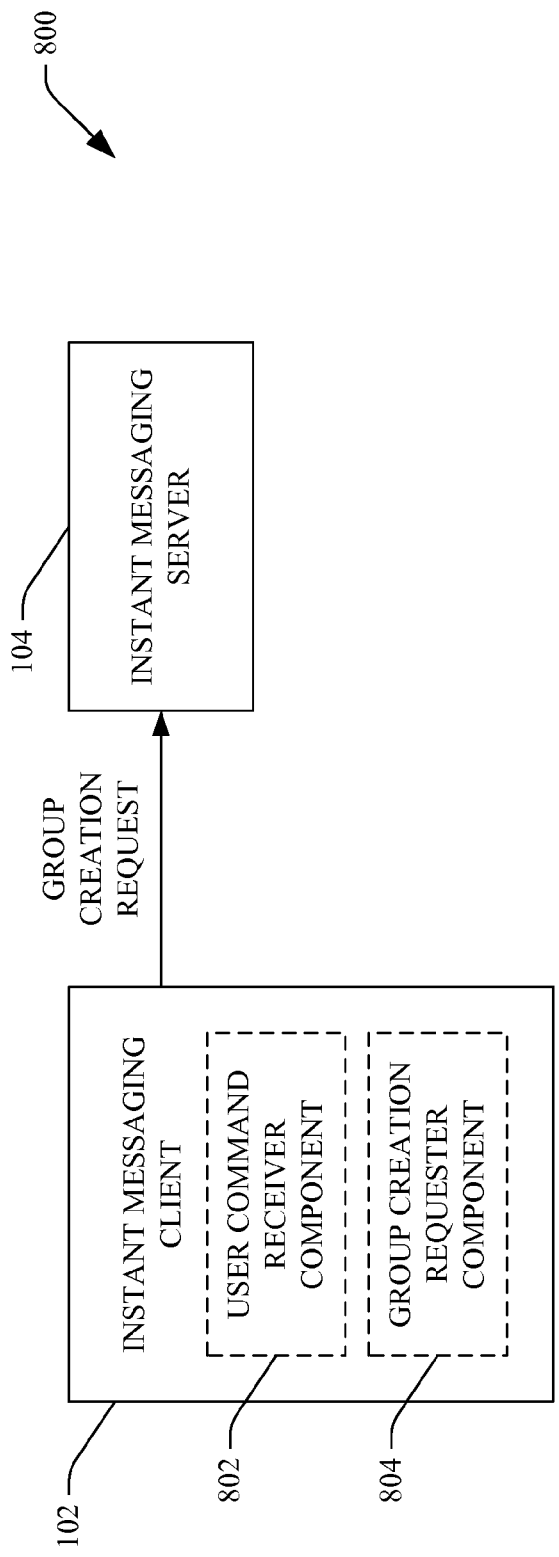
FIG. 8 is a functional block diagram of an example system that facilitates creating a persistent messaging group in an instant messaging application.

Now turning to FIG. 8, an example system 800 that facilitates creating a persistent messaging group is illustrated. The system 800 includes the instant messaging client 102 that is used by an individual who wishes to create a persistent messaging group (e.g., a group that includes a plurality of individuals that will persist over multiple instant messaging sessions). In this example, the instant messaging client 102 includes a user command receiver component 802 that receives a user command to create a persistent messaging group. For instance, the user may employ a drop-down menu made available by way of the instant messaging client 102 to inform the instant messaging client of a desire to create a persistent messaging group. The user command may include a proposed name of the persistent messaging group, proposed members of the persistent messaging group, and/or permissions corresponding to one or more of the proposed members. For instance, to identify proposed members, the user may import contacts from an email application. In another example, to identify proposed members, the user may import contacts from a social network site. Other manners for the user to identify proposed members are contemplated and intended to fall under the scope of the hereto-appended claims.

The instant messaging client 102 can additionally include a group creation requester component 804 that can request creation of the persistent messaging group based upon user command(s) received by the user command receiver component 802. For example, the group creation requester component 804 can format data in a suitable format and transmit a group creation request to the instant messaging server 104. The instant messaging server 104 can act to create the persistent messaging group as described above.

Figure 9:
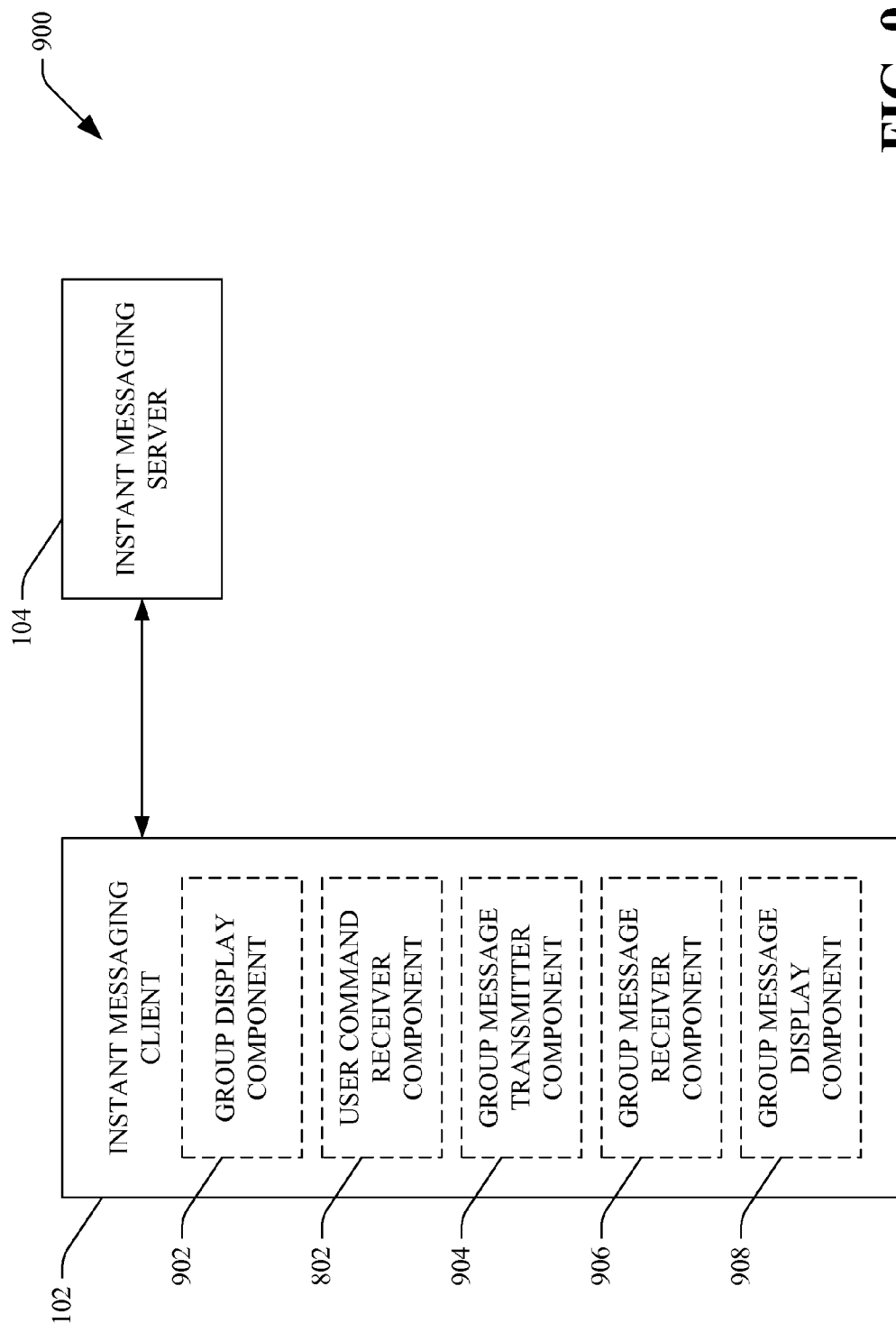
FIG. 9 is a functional block diagram of an example system that facilitates transmitting messages to a persistent messaging group in an instant messaging application.

Turning now to FIG. 9, an example system 900 that facilitates communicating by way of an instant messaging application to a persistent messaging group is illustrated. The system 900 includes the instant messaging client 102 that is in communication with the instant messaging server 104. In this example, the instant messaging client 102 includes a group display component 902. The group display component can cause the instant messaging client 102 to display a graphical indication of existence of at least one persistent messaging group to a user (e.g., the user is a member of the at least one persistent messaging group). The graphical indication may be an icon, text, a combination of an icon and text, or other suitable graphical indication. Furthermore, the group display component 902 can cause a status of the persistent messaging group to be displayed, such as whether the group (collectively) is offline, whether the group is busy, idle, etc.

The instant messaging client 102 can also include the user command receiver component 802, which can receive input from the user, such as through employment of a mouse or keyboard. In an example, the user command receiver component 802 can receive input indicating that the user has selected a particular group that is displayed by the group display component 902. Such selection, for instance, may initiate provision of a conversation window to the user, wherein the conversation window can be used to communicate with members of the group.

The instant messaging client 102 can also include a group message transmitter component 904 that can transmit a message from the user to the group. For instance, the user can enter a message into a conversation window pertaining to the group. The user command receiver component 802 can receive a command to transmit the message, and the group message transmitter component 904 can transmit the message in response to the received command. The group message transmitter component 904 can transmit the group message to the instant messaging server 104, which can then transmit the message to members of the group who are online and/or persist the messages in a data store (e.g., for offline messaging).

The instant messaging client 102 can further include a group message receiver component 906 that can be configured to receive messages directed towards the group from a different member of the group. For instance, a member of the group may reply to a previous group message, and the group message receiver component 906 can be configured to receive the reply from the instant messaging server 104. A group message display component 908 can display group messages received by the group message receiver component 906. For instance, the group message display component 908 can cause a conversation window to be displayed at the instant messaging client 102. In another example, the group message display component 908 can cause text or graphics to be displayed in an existing conversation window pertaining to a persistent messaging group. In yet another example, the group message display component 908 can be configured to present audio and/or video information to a user that is transmitted to the instant messaging client 102.

Figure 10:
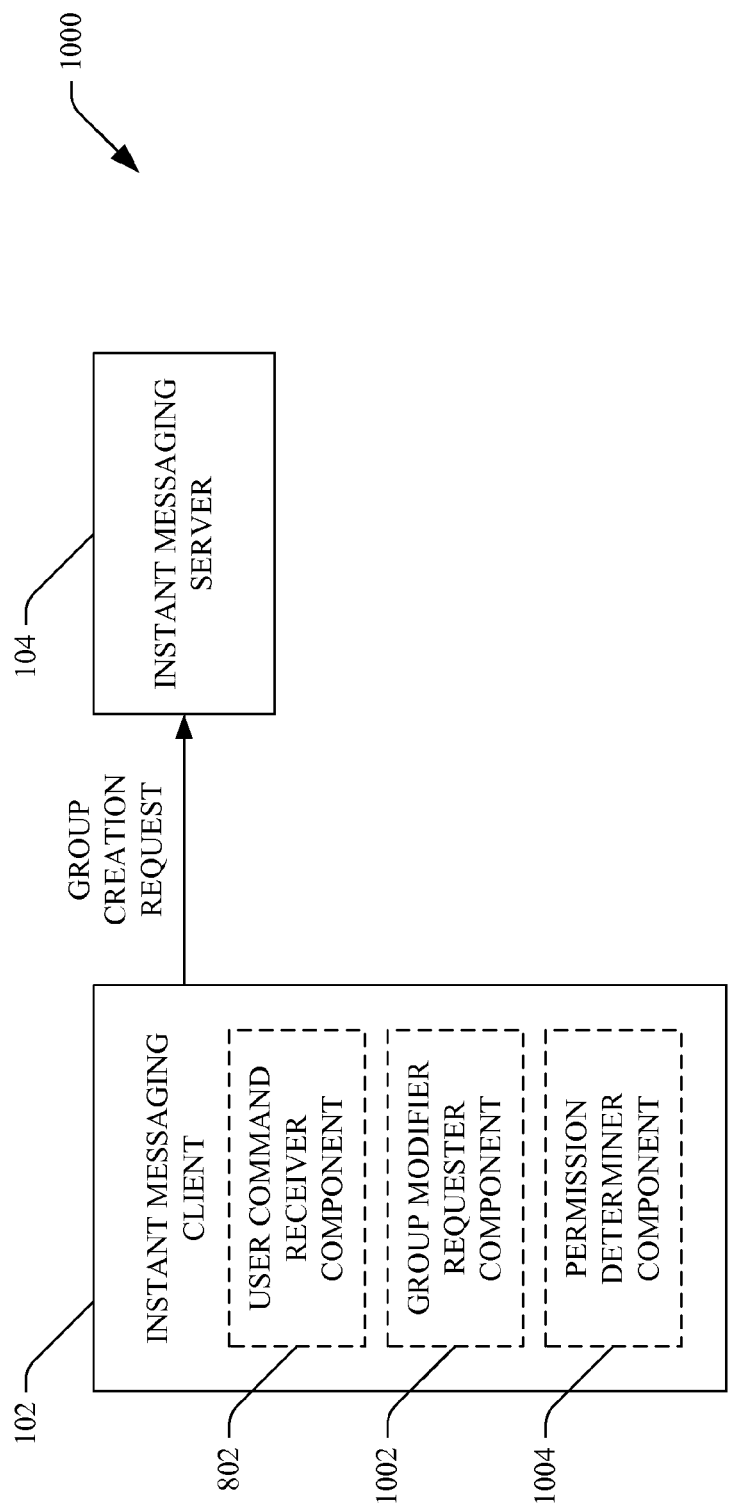
FIG. 10 is a functional block diagram of an example system that facilitates modifying a persistent messaging group in an instant messaging application.

With reference now to FIG. 10, an example system 1000 that facilitates altering information pertaining to a persistent messaging group is illustrated. The system 1000 includes the instant messaging client 102, wherein the instant messaging client 102 is in communication with the instant messaging server 104. The instant messaging client 102 includes the user command receiver component 802, which can receive a command indicating that the user would like to modify the persistent messaging group and/or modify content of messages deliverable to members of the persistent messaging group. For instance, the user command receiver component 802 may receive a user command indicating that the user wishes to invite another entity to join the persistent messaging group. In another example, the user command receiver component 802 can receive a user command indicating that the user wishes to change a background in a conversation window pertaining to the persistent messaging group (e.g., wherein the background will be common to conversation windows of all members of the persistent messaging group). For instance, the user can initiate the command by selecting particular commands that are graphically represented in the instant messaging client 102, through selection of pull-down menus, etc.

The instant messaging client 102 also includes a group modifier requester component 1002 that can transmit group modification requests (initiated by the user through the user command receiver component 802). The group modifier requester component 1002 can be configured to transmit the request to the instant messaging server 104 in a suitable format. Requests that can be transmitted by the group modifier requester component 1002 include but are not limited to a request to invite one or more additional entities to join the group, a request to be removed from the group, a request that another entity to be removed from the group, a request to set a background for the group, a request to add or delete a shared folder pertaining to the group, etc. The instant messaging server 104, as described above, can include components that act to process such requests.

The instant messaging client 102 can also include a permission determiner component 1004 that can determine permissions of the user corresponding to the instant messaging client 102. For instance, the permission determiner component 1004 can determine that the user does not have permission to invite others to join the persistent messaging group, and therefore such option may be unavailable to the user (e.g., grayed out).

While the examples described herein illustrate an instant messaging client that is used by a user in a persistent messaging group communicating with other group members by way of an instant messaging server, it is to be understood that the systems and methods described herein can be adapted for use in a peer-to-peer environment. For instance, an instant messaging application installed at a client device can include functionality that allows the client device to act as a client and a server. In another example, messages can be persisted at client devices, and group information can be persisted at client devices (in addition to or alternatively to retaining persisted messages and group information at a central location).

With reference now to FIGS. 11-15, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 11:
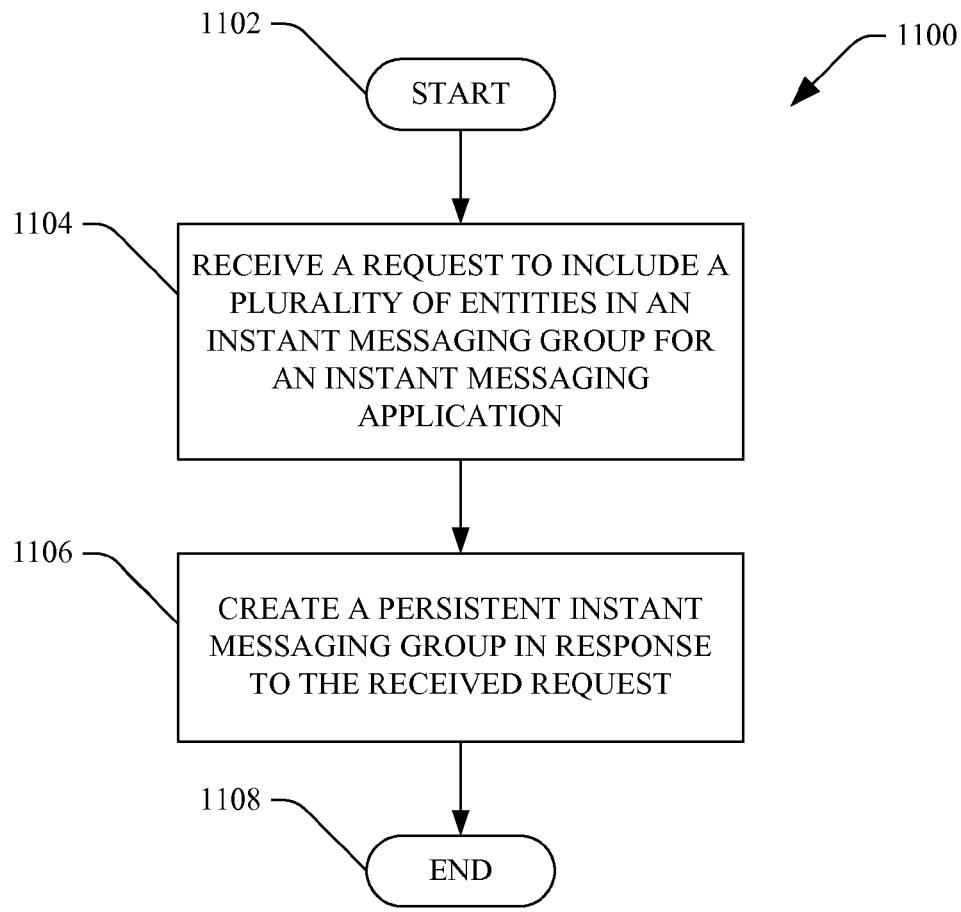
FIG. 11 is a flow diagram that illustrates an example methodology for creating a persistent instant messaging group in an instant messaging application.

Referring now to FIG. 11, an example methodology 1100 for creating a persistent messaging group is illustrated. The methodology 1100 starts at 1102, and at 1104 a request is received to include a plurality of entities in an instant messaging group for an instant messaging application. In an example, the request may be a request to include three or more entities in an instant messaging group, wherein an entity may be an individual or a group of individuals.

At 1106, a persistent instant messaging group is created in response to the received request. For example, the persistent instant messaging group can be persisted over multiple instant messaging sessions. Furthermore, the persistent messaging group can include three or more entities. It is to be understood, however, that a persistent messaging group may include as few as one entity (where the group persists, but membership to the group can change).

After the persistent messaging group has been created, a client device can be configured to indicate to a user that the user belongs to the persistent messaging group. For instance, data can be transmitted to at least one client device that corresponds to at least one entity in the persistent messaging group, wherein the client device runs the instant messaging application. Pursuant to an example, the transmitted data can be configured to cause the instant messaging application to display an indicator that is representative of the persistent instant messaging group at the client device (e.g., an icon, text, or some combination thereof). In an example, the client device may be a personal computer, a laptop computer, a smart phone, a personal digital assistant, or other suitable device. The methodology 1100 completes at 1108.

Figure 12:
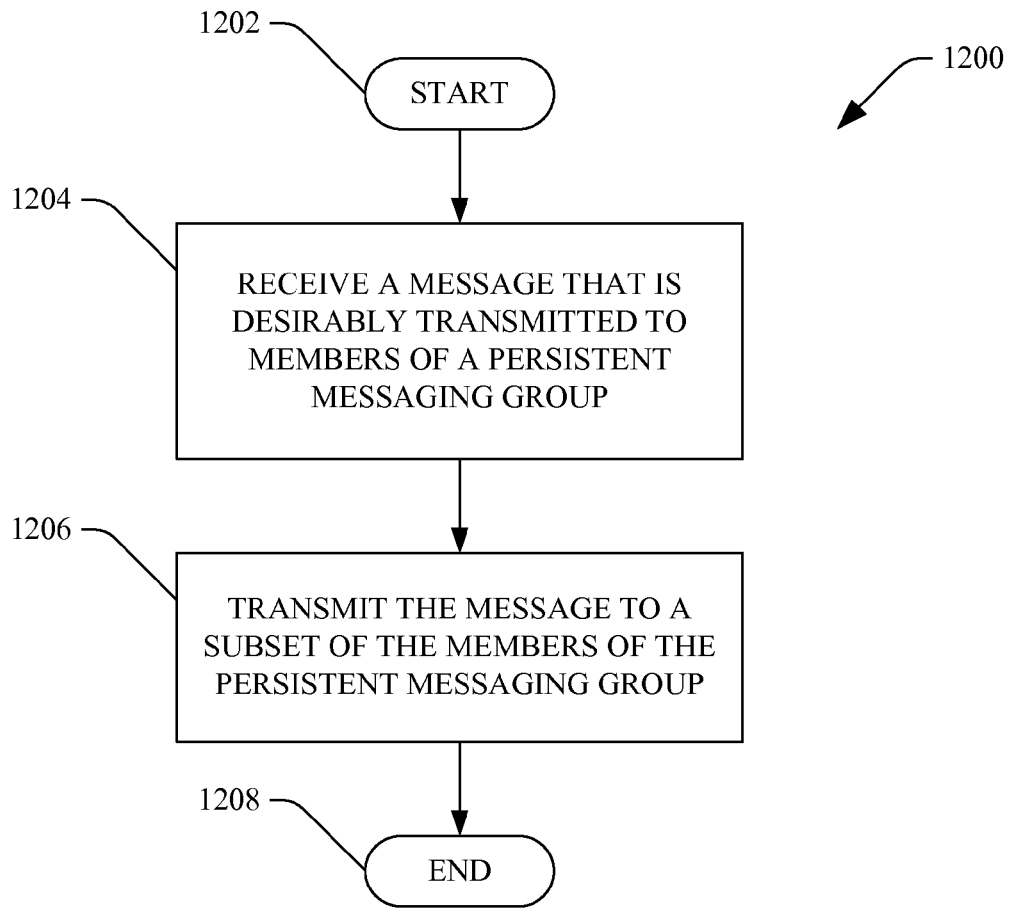
FIG. 12 is a flow diagram that illustrates an example methodology for transmitting a message to members of a persistent messaging group in an instant messaging application.

Now referring to FIG. 12, an example methodology 1200 for transmitting messages to a persistent messaging group is illustrated. The methodology 1200 starts at 1202, and at 1204 an instant message is received from a first entity in a persistent messaging group by way of an instant messaging application, wherein the instant message is directed to the persistent messaging group. At 1206, the instant message is transmitted to a subset of the instant persistent messaging group (e.g., members of the instant messaging group who are logged into the instant messaging application). In an example, the received instant message can be transmitted as an offline message to members of the persistent messaging group who were not logged into the instant messaging application when the instant message was initially received. The methodology 1200 then completes at 1208.

Figure 13:
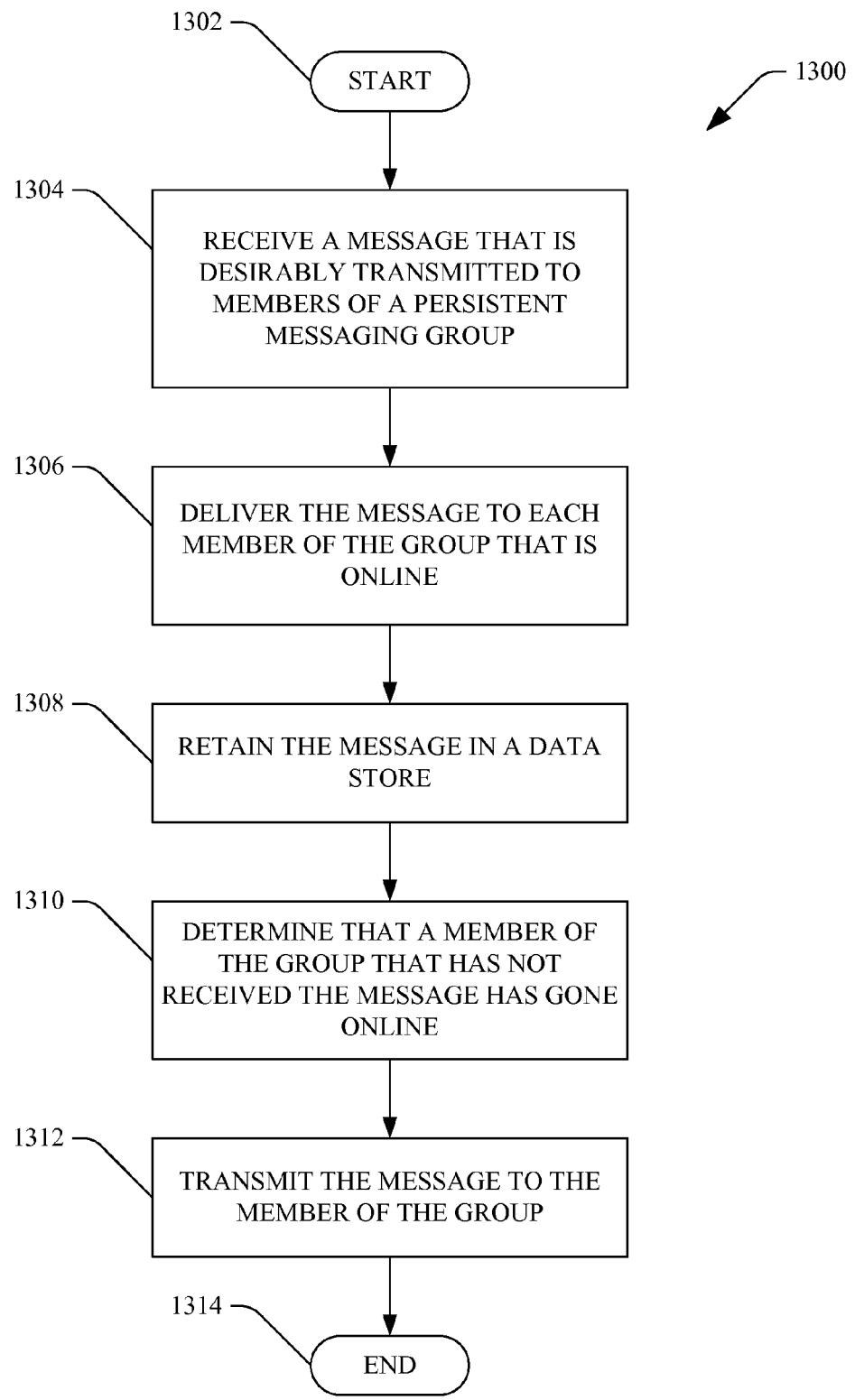
FIG. 13 is a flow diagram that illustrates an example methodology for transmitting an offline message to a member of a persistent messaging group in an instant messaging application.

Referring now to FIG. 13, an example methodology 1300 for transmitting a message to a persistent messaging group is illustrated. The methodology 1300 starts at 1302, and at 1304 a message is received that is desirably transmitted to members of a persistent messaging group (e.g., a messaging group that is persisted over multiple instant messaging sessions). The message can include textual, pictorial, audio, and/or video content. At 1306, the message is delivered to each member of the persistent messaging group who is online (e.g., logged into an instant messaging application).

At 1308, the received message is retained in a data store. For instance, the data store may reside at an instant messaging server. At 1310, a determination is made that a member of the group who has not received the message (e.g., a member of the group who was offline when the message was initially received) has gone online (e.g., logged into the instant messaging application). At 1312, the message is transmitted to the member of the group. Thus, group members may communicate with the group by way of offline messaging. The methodology 1300 then completes at 1314.

Figure 14:
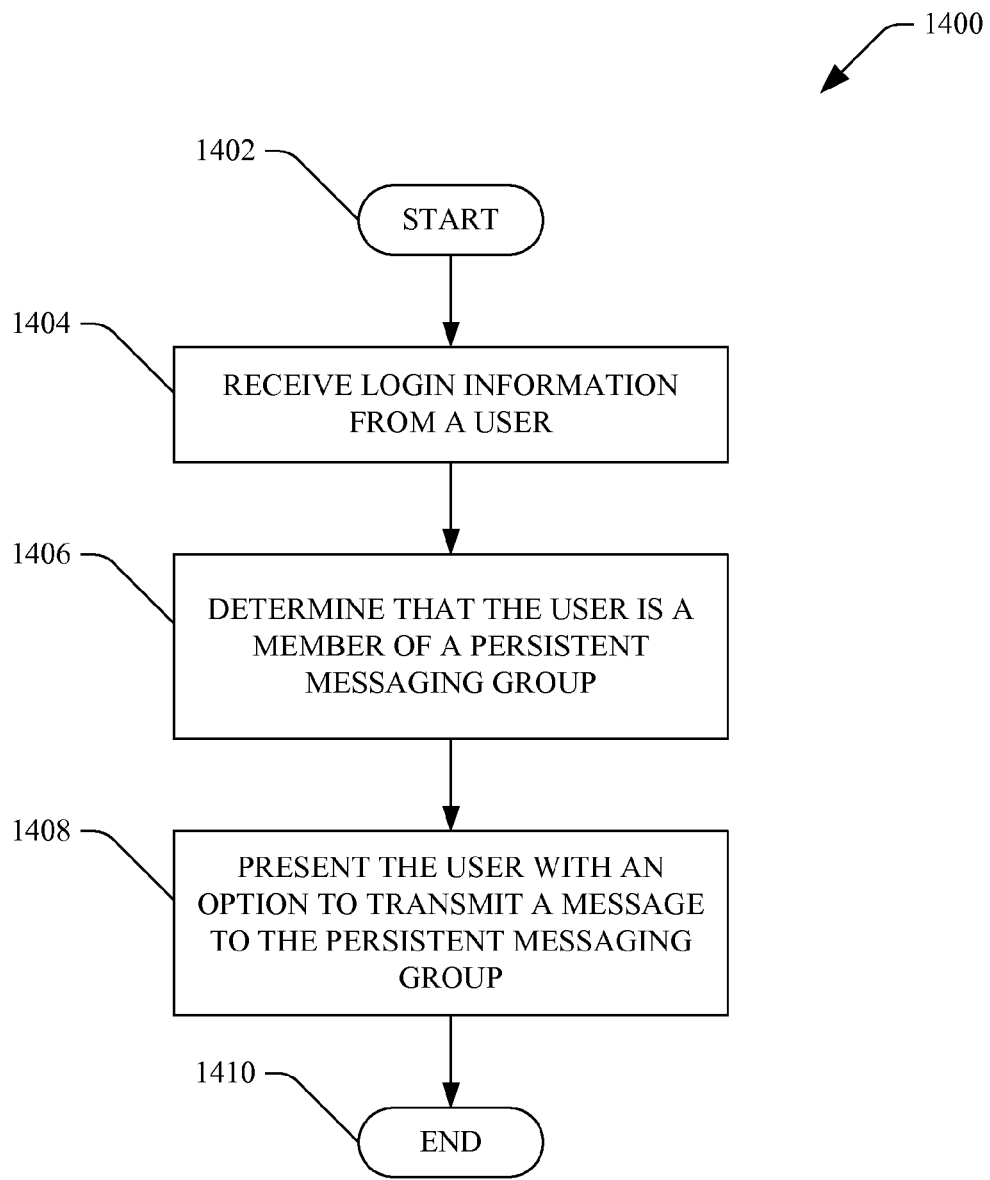
FIG. 14 is a flow diagram that illustrates an example methodology for presenting a user with an option to transmit a message to a persistent messaging group in an instant messaging application.

With reference now to FIG. 14, an example methodology 1400 for displaying information to a user is illustrated. The methodology 1400 starts at 1402, and at 1404 login information is received from a user who is logging into an instant messaging application at an instant messaging client. For instance, the user may provide a username and password to log into the instant messaging application. At 1406 a determination is made that the user is a member of a persistent messaging group. At 1408, an indicator is displayed to the user, wherein the indicator is representative of the persistent messaging group. The methodology 1400 completes at 1410.

Figure 15:
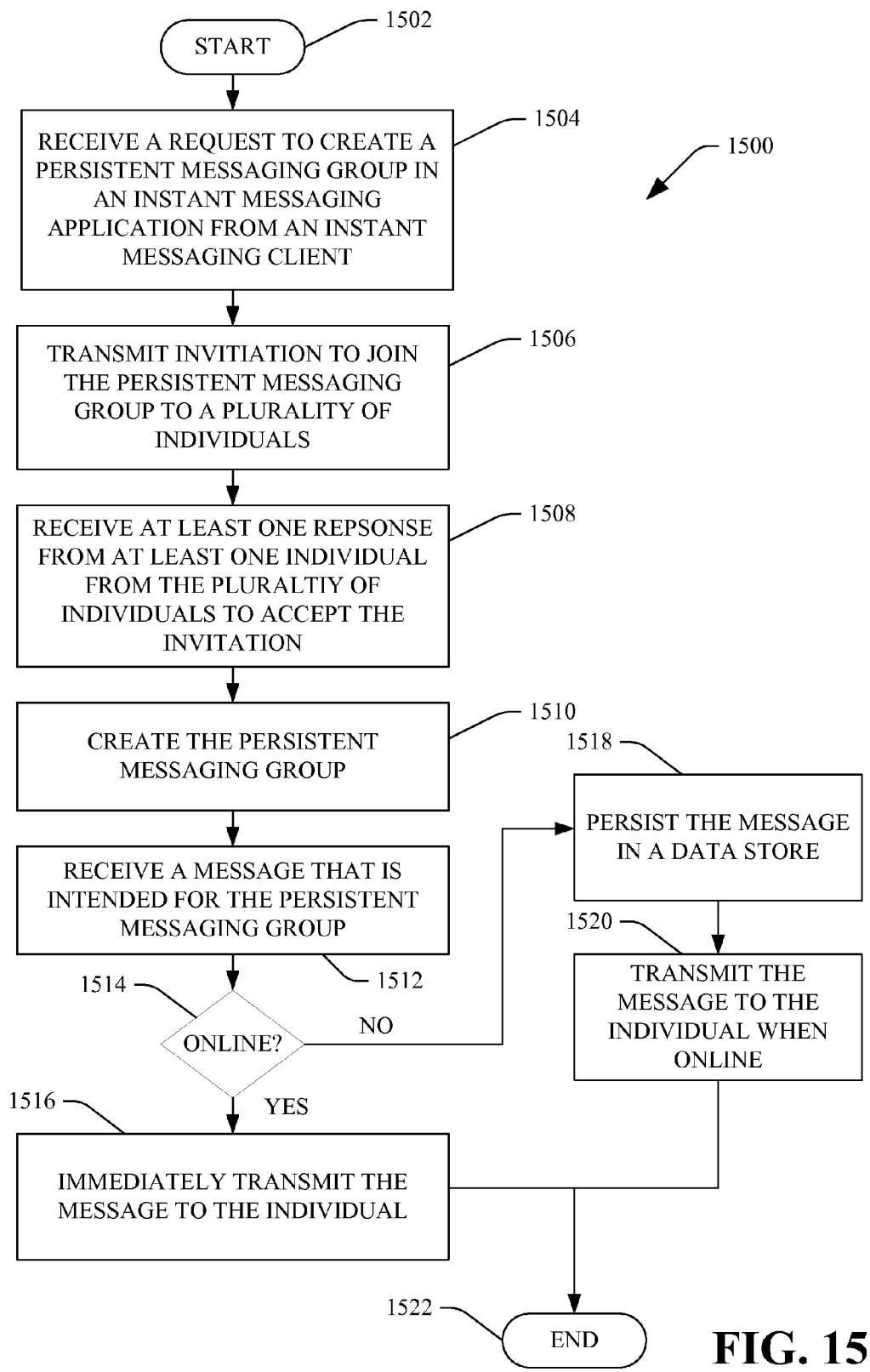
FIG. 15 is a flow diagram that illustrates an example methodology for transmitting a message to a persistent messaging group in an instant messaging application.

Now referring to FIG. 15, an example methodology 1500 for transmitting instant messages to persistent group members is illustrated. The methodology 1500 starts at 1502, and at 1504 a request to create a persistent messaging group in an instant messaging application is received from an instant messaging client. At 1506, an invitation to join the persistent messaging group is transmitted to a plurality of individuals.

At 1508, at least one response is received from at least one individual in the plurality of individuals, wherein the response indicates that the at least one individual has accepted the invitation. At 1510, the persistent messaging group is created. At 1512, an instant message is received that is intended for the persistent messaging group (e.g., a message transmitted by a member of the persistent messaging group).

At 1514, a determination is made regarding whether the at least one individual is currently online (e.g., logged into the instant messaging application). If the individual is online, the instant message is immediately transmitted to the at least one individual at 1516. If the individual is not currently online, at 1518 the instant message is persisted in a data store (for example, a data store corresponding to an instant messaging server). It is to be understood, however, that the instant message can be retained in a data store regardless of whether or not the user is currently online. At 1520, the message is transmitted to the at least one individual when the at least one individual goes online (e.g., logs into the instant messaging application). The methodology 1500 completes at 1522.

Figure 16:
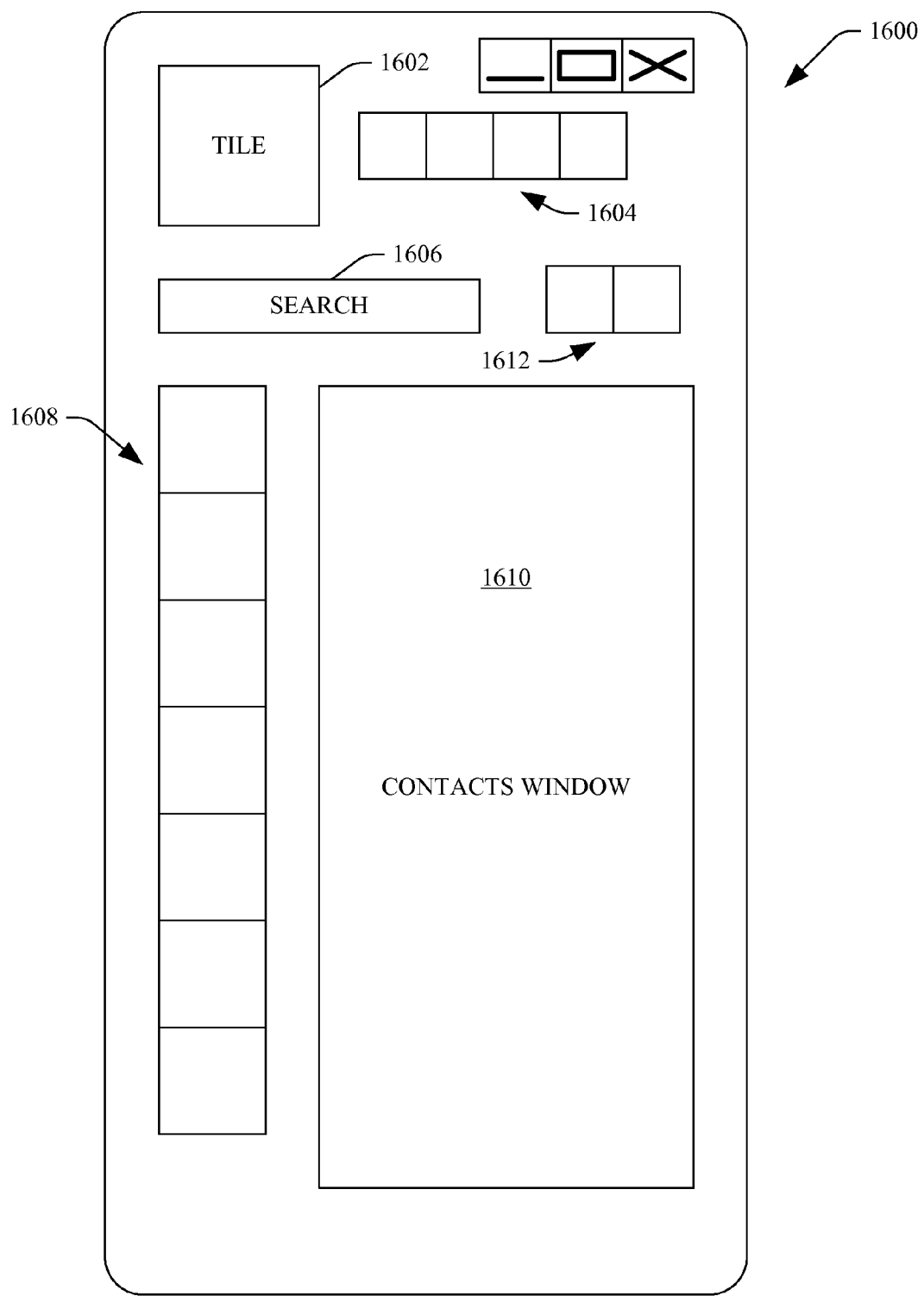
FIG. 16 is an example graphical user interface that can be used in connection with an instant messaging application.

Now turning to FIG. 16, an example graphical user interface 1600 of an instant messaging application is illustrated. The graphical user interface 1600 pertains to an instant messaging client application that executes on a client device. Further, the graphical user interface 1600 can pertain to a particular individual.

The graphical user interface 1600 includes a tile 1602 that can be used to identify an individual corresponding to the graphical user interface 1600. Accordingly, the tile can be a picture of the individual, a graphic selected by the individual, etc. The graphical user interface 1600 can also include a plurality of selectable buttons 1604, wherein selection of a button can initiate a particular functionality. For instance, selection of one of the buttons may initiate opening an email inbox, selection of one of the buttons may initiate viewing sharing folders, selection of one of the buttons may initiate a voice conversation via the instant messaging application, etc.

The graphical user interface 1600 may also include a search field 1606, wherein the search field 1606 is configured to receive a search query. The user, after entering text into the search field 1606, may initiate a search by depressing a particular key on a keyboard (e.g., an "enter" key), by selecting a button the graphical user interface 1600, and/or other suitable manner for initiating a search. Upon initiating the search, the instant messaging application can initiate a web browser that can display search results.

The graphical user interface 1600 can also include a plurality of depressible buttons 1608 that can initiate various functionalities, open web browsers, and/or provide the user with particular information. For example, selection of one of the buttons 1608 can initiate help information to be displayed in the graphical user interface 1600, selection of another one of the buttons 1608 may initiate provision of financial information (e.g., real-time stock quotes) by way of the graphical user interface 1600, and selection of yet another one of the buttons 1608 may initiate information pertaining to a social networking site or online dating site. Other functionalities/information are also contemplated.

The graphical user interface 1600 can also include a contacts window 1610 that displays instant messaging contacts of the user who is using the graphical user interface 1600. As described herein, the contacts window 1610 can display individual contacts as well as persistent groups. For instance, the contacts window 1610 can display icons that are representative of individual contacts of the user as well as one or more icons that are representative of persistent group contacts of the user. Each of the contacts can be selected by the user, which can initiate a conversation window, wherein the user can send a message to the selected contact (which can be a group) by way of the conversation window.

The graphical user interface 1600 can also include a plurality of buttons 1612 that can be used to sort contacts displayed in the contacts window 1610. For instance, depression of one of the buttons 1612 may cause contacts to be displayed alphabetically. In another example, depression of one of the buttons 1612 may cause persistent messaging groups to be displayed in a first location and individual contacts to be displayed in a second location. In yet another example, depression of one of the buttons 1612 may initiate adding a contact and/or creating a group.

Figure 17:
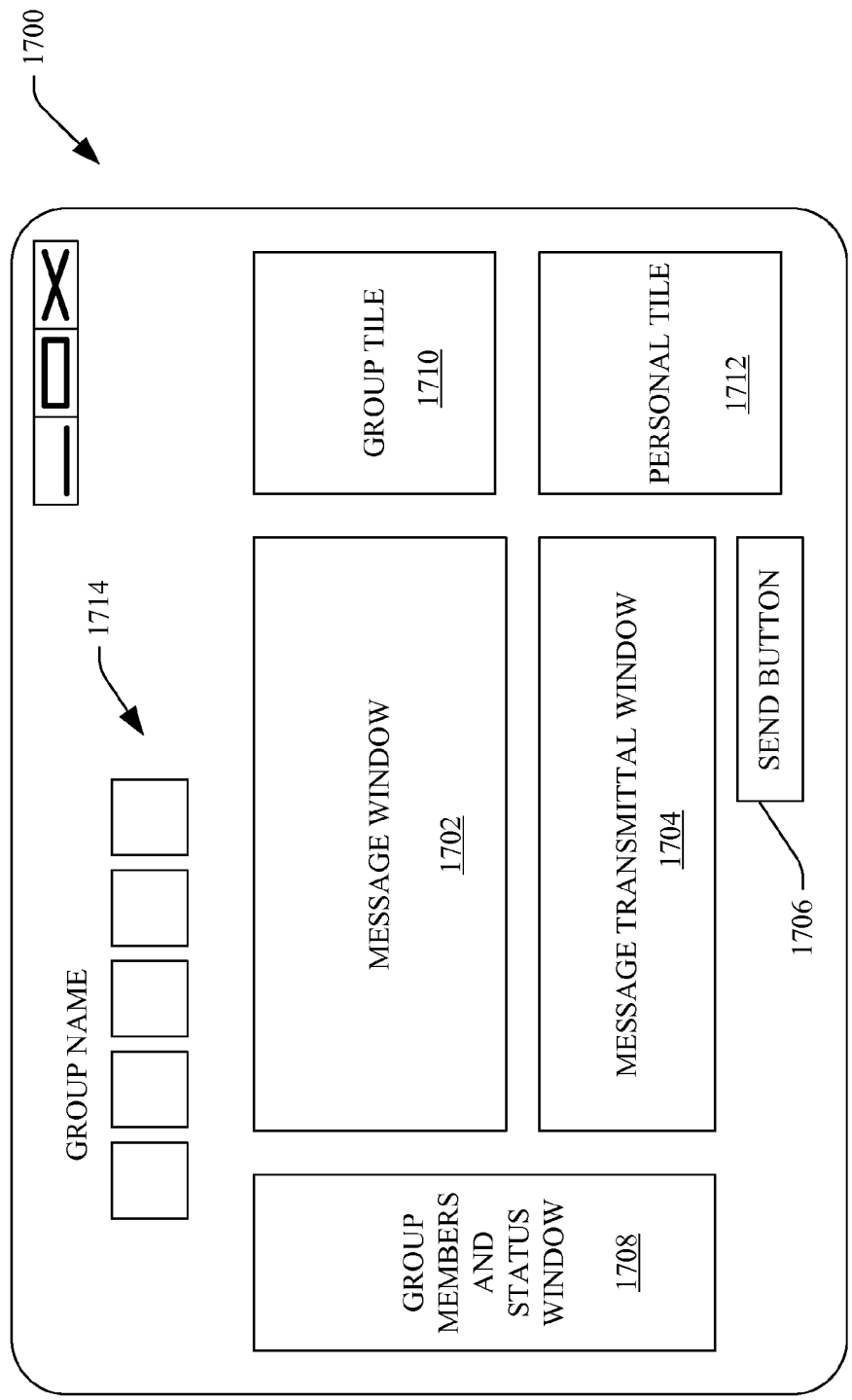
FIG. 17 illustrates an example conversation window.

Now referring to FIG. 17, an example persistent group conversation window 1700 is illustrated. The conversation window 1700 includes a message window 1702 that can display messages transmitted to the group (or group members) by group members. In addition, the message window 1702 can display files that are submitted by members of the persistent messaging group as well as a background that can be common for members of the instant messaging group. In one example, the background can be a collage of tiles of members of the persistent messaging group. In another example, the background can be selected by a member of persistent messaging group who has privileges to set backgrounds.

The conversation window 1700 can also include a message transmittal window 1704, wherein a user of the conversation window 1700 can enter text and/or drag and drop files into the message transmittal window 1704. The conversation window 1700 can also include a send button 1706, wherein upon depression of the send button 1706 data in the message transmittal window 1704 can be transmitted to the persistent messaging group (e.g., transmitted to each member of the persistent messaging group, either as an online or an offline message).

The conversation window 1700 can also include a group members and status window 1708, which can display, for instance, identities of each member of the persistent messaging group and their current status (e.g., available, busy, offline, . . . ). In an example, if desirable, the user can select an individual member in the group members and status window 1708, which can initiate a new conversation window that is configured to send and receive messages from the selected individual member only (and not other members of the group).

The conversation window 1700 can also include a group tile 1710 that can be a tile that graphically identifies the group. For instance, the group tile 1710 can be selected by a member of the persistent messaging group who has privileges to set content for the group tile 1710. The conversation window 1700 can also include a personal tile 1712, which can be set by the individual using the conversation window 1700.

The conversation window 1700 can also include a plurality of selectable buttons 1714, wherein selection of one of the buttons initiates particular functionality corresponding to the conversation window 1700. For instance, selection of one of the buttons may initiate creating a shared folder and/or viewing a shared folder. In another example, selection of one of the buttons 1714 may initiate a voice communication to all members of the persistent messaging group. In yet another example, selection of one of the buttons 1714 may initiate sharing a music file with members of the persistent messaging group.

Figure 18:
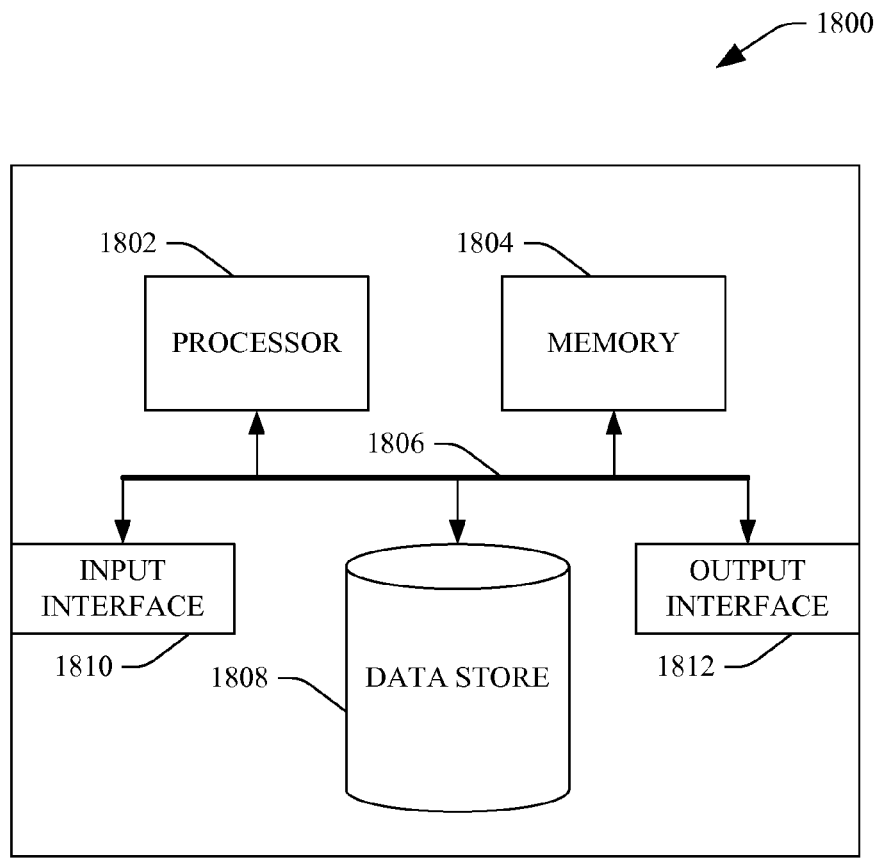
FIG. 18 is an example computing system.

Now referring to FIG. 18, a high-level illustration of an example computing device 1800 that can be used in accordance with the systems and methodologies disclosed herein is illustrated. For instance, the computing device 1800 may be used in a system that can be used to receive and transmit instant messages pertaining to a persistent messaging group and/or used to retain data pertaining to an instant messaging group. The computing device 1800 includes at least one processor 1802 that executes instructions that are stored in a memory 1804. The instructions may be, for instance, instructions for implementing functionality described as being carried out by one or more components discussed above or instructions for implementing one or more of the methods described above. The processor 1802 may access the memory 1804 by way of a system bus 1806. In addition to storing executable instructions, the memory 1804 may also store data pertaining to a persistent messaging group, identities, background schemes to be displayed in conversation windows, etc.

The computing device 1800 additionally includes a data store 1808 that is accessible by the processor 1802 by way of the system bus 1806. The data store 1808 may include executable instructions, data pertaining to a persistent messaging group, etc. The computing device 1800 also includes an input interface 1810 that allows external devices to communicate with the computing device 1800. For instance, the input interface 1810 may be used to receive instructions from an external computer device, receive instant messages to be transmitted, etc. The computing device 1800 also includes an output interface 1812 that interfaces the computing device 1800 with one or more external devices. For example, the computing device 1800 may transmit data to a personal computer by way of the output interface 1812.

Additionally, while illustrated as a single system, it is to be understood that the computing device 1800 may be a distributed system. Thus, for instance, several devices may be in communication by way of a network connection and may collectively perform tasks described as being performed by the computing device 1800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed on a client computing device operated by a first user, the method comprising:
receiving an indication that the first user is a member of a persistent instant messaging group in an instant messaging application, wherein a first instance of the instant messaging application is installed on the client computing device, wherein the persistent instant messaging group persists across multiple accesses to respective instances of the instant messaging application executing on client computing devices of respective members of the instant messaging group;
receiving an indication that the first user has logged into the first instance of the instant messaging application on the client computing device;
subsequent to receiving the indication that the first user has logged into the first instance of the instant messaging application, receiving a message transmitted to the persistent instant messaging group from another member of the instant messaging group when the first user was not logged into the first instance of the instant messaging application, wherein the message is received from an instant messaging server in communication with the client computing device; and
displaying the message on a display screen of the client computing device responsive to receiving the message from the instant messaging server.

2. The method of claim 1, wherein the persistent instant messaging group comprises at least three members.

3. The method of claim 2, wherein at least one member of the persistent instant messaging group is a second persistent instant messaging group.

4. The method of claim 1, wherein the client computing device is a mobile telephone.

5. The method of claim 1, further comprising:
when the first user is logged into the first instance of the instant messaging application, receiving a second message from the first user to the persistent instant messaging group; and
transmitting the second message to the instant messaging server responsive to the receiving of the second message from the first user.

6. The method of claim 1, wherein the first instance of the instant messaging application is comprised by a web browser.

7. The method of claim 1, further comprising:
when the first user is logged into the first instance of the instant messaging application, receiving an invitation from the first user that is configured to invite a second user to join the persistent instant messaging group; and
transmitting the invitation to the instant messaging server responsive to the receiving of the invitation from the first user.

8. The method of claim 1, further comprising:
subsequent to receiving the indication that the first user has logged into the first instance of the instant messaging application, receiving a plurality of messages transmitted to the persistent instant messaging group from members of the persistent instant messaging group at previous points in time, wherein the plurality of messages are received from the instant messaging server; and
displaying the plurality of messages on the display screen of the client computing device responsive to the receiving of the plurality of messages from the instant messaging server.

9. The method of claim 1, further comprising:
receiving an indication that at least one other member of the persistent instant messaging group is logged into a respective instance of the instant messaging application on another client computing device; and
displaying an icon on the client computing device that indicates to the first user that the at least one other member of the persistent instant messaging group is logged into the respective instance of the instant messaging application on the another client computing device.

10. The method of claim 9, wherein the icon comprises a name of the persistent instant messaging group and a display tile for the persistent instant messaging group.

11. The method of claim 1, wherein the message comprises at least one of an image or a video.

12. A computing system, comprising:
a display screen;
a processor; and
a memory that comprises an instance of an instant messaging application that is executed by the processor, the instance of the instant messaging application comprising a plurality of components, the plurality of components comprising:
a group message receiver component that receives an instant message that transmitted from a client computing device to members of a persistent instant messaging group, wherein a user of the computing system is a member of the persistent instant messaging group, wherein the persistent instant messaging group persists across executions of the instance of the instant messaging application on the computing system, and wherein the instant message was transmitted when the user of the computing system was not logged into the instance of the instant messaging application; and
a group message display component that displays the instant message on the display screen responsive to the user of the computing system logging into the instance of the instant messaging application.

13. The computing system of claim 12 being a mobile telephone.

14. The computing system of claim 12, wherein a web browser comprises the instance of the instant messaging application.

15. The computing system of claim 12, wherein the instant message comprises an image or a video.

16. The computing system of claim 12, wherein the plurality of components further comprises a group display component that displays a graphical icon on the display screen responsive to the user of the computing system logging into the instance of instant messaging application, the graphical icon representative of the persistent instant messaging group.

17. The computing system of claim 16, wherein the group display component displays the graphical icon to indicate to the user of the computing system that at least one other member of the persistent instant messaging group is online.

18. The computing system of claim 12, wherein the persistent instant messaging group comprises at least three members.

19. The computing system of claim 12, wherein the plurality of components further comprises a group message transmitter component that transmits a message received from the user of the computing system that is directed to the persistent instant messaging group to the instant messaging server.

20. A computer-readable memory comprising instructions that, when executed by a processor, cause the processor to perform acts comprising:
- receiving a request from a user to log into an instant messaging application on a client computing device;
- logging into the instant messaging application;
- responsive to logging into the instant messaging application, receiving an indication from an instant messaging server that the user is a member of a persistent instant messaging group that persists across multiple log-ins of the user into the instant messaging application;
- responsive to logging into the instant messaging application, receiving from the instant messaging server an instant message transmitted by another member of the persistent instant messaging group when the user was not logged into the instant messaging application; and
- displaying the instant message to the user by way of the instant messaging application as an offline message.

* * * * *